(12) United States Patent
Lugg

(10) Patent No.: US 8,365,510 B2
(45) Date of Patent: Feb. 5, 2013

(54) MAGNETIC ADVANCED GENERATION JET ELECTRIC TURBINE

(76) Inventor: Richard H. Lugg, Falmouth, ME (US)

( * ) Notice: Subject to any disclaimer, the term of this patent is extended or adjusted under 35 U.S.C. 154(b) by 0 days.

(21) Appl. No.: 13/059,240

(22) PCT Filed: Aug. 19, 2009

(86) PCT No.: PCT/US2009/054317
§ 371 (c)(1),
(2), (4) Date: Feb. 16, 2011

(87) PCT Pub. No.: WO2010/096087
PCT Pub. Date: Aug. 26, 2010

(65) Prior Publication Data
US 2011/0138765 A1 Jun. 16, 2011

Related U.S. Application Data

(60) Provisional application No. 61/189,365, filed on Aug. 19, 2008, provisional application No. 61/224,666, filed on Jul. 10, 2009.

(51) Int. Cl.
*F02C 3/00* (2006.01)
(52) U.S. Cl. .......................................... 60/39.01; 310/11
(58) Field of Classification Search .................. 60/39.01, 60/465; 310/11
See application file for complete search history.

(56) References Cited

U.S. PATENT DOCUMENTS

| | | | | |
|---|---|---|---|---|
| 2,659,528 A | * | 11/1953 | Price | 415/47 |
| 4,874,312 A | * | 10/1989 | Hailey | 132/122 |
| 5,170,623 A | * | 12/1992 | Dailey et al. | 60/202 |
| 5,452,575 A | | 9/1995 | Freid | |
| 2005/0034464 A1 | | 2/2005 | Gonzalez | |
| 2007/0126292 A1 | * | 6/2007 | Lugg | 310/11 |
| 2007/0251241 A1 | * | 11/2007 | Fielder | 60/804 |
| 2010/0083669 A1 | * | 4/2010 | Foster et al. | 60/802 |

FOREIGN PATENT DOCUMENTS

WO 2007035298 A2 3/2007

OTHER PUBLICATIONS

International Search Report dated Jun. 7, 2010 for PCT/US09/54317.

* cited by examiner

*Primary Examiner* — Ehud Gartenberg
*Assistant Examiner* — Arun Goyal
(74) *Attorney, Agent, or Firm* — Burne & Levinson LLP; Bruce D. Jobse; Chris A. Caseiro

(57) ABSTRACT

Supersonic Magnetic Advanced Generation Jet Electric Turbine (S-MAGJET) described herein, and a subsonic derivative, MAGJET, integrate a gas power turbine, superconducting electric power and propulsion generation, and magnetic power flux field systems along with an ion plasma annular injection combustor which utilizes alternative petroleum-based fuel and combustion cycles to create a hybrid turbine turbomachine for aerospace propulsion. The propulsion unit is able to achieve a dramatic increase in horsepower, combustion and propulsion efficiency, and weight reduction. In addition, the turbomachinery structures may be disposed within an exo-skeleton architecture that achieves an increase in thrust to weight ratio with a concomitant increase in fuel efficiency and power generation over traditional gas turbine technology today. The engine continuously adjusts the temperature, pressure and mass airflow requirements using an electromagnetic power management system architecture. Engine performance may be controlled across the entire desired flight envelope, whether subsonic, transonic or supersonic flight conditions.

5 Claims, 27 Drawing Sheets

MAGNETIC ADVANCED GENERATION JET ELECTRIC TURBINE

RELATED APPLICATIONS

This application claims priority to co-pending, commonly owned Provisional Patent Application Ser. No. 61/189,365, entitled MAGNETIC ADVANCED GENERATION JET ELECTRIC TURBINE, filed Aug. 19, 2008, by inventor Richard H. Lugg, and Provisional Patent Application Ser. No. 61/224,666 entitled MAGNETIC ADVANCED GENERATION JET ELECTRIC TURBINE, filed Jul. 10, 2009, by inventor Richard H. Lugg.

FIELD OF THE INVENTION

The subject matter described herein relates generally to jet engines and more particularly to hybrid engines that generate both significant thrust and surplus electrical energy to drive other engine components.

BACKGROUND OF THE INVENTION

Over the past 10-20 years research has focused on increasing jet engine performance while reducing engine weight and reducing the costs associated with engine production and maintenance. In particular, government and military funded programs have focused on using ceramic components for the hot section of gas turbine engines to allow for higher turbine inlet temperatures and, therefore, higher thermal efficiencies. In addition, research is focusing on a truly integrated engine and airframe propulsion system in which the engine casing becomes a part of the airframe. This would allow for a dramatic weight reduction in overall weight and an increase in engine performance. However, these development programs have focused on 70 year old gas turbine technology.

In addition, the DOD and Armed Services are now demanding significant increases in electric output from turbine flight engines. For example, there are now requirements for the generation of up to 2-5 megawatts of electrical power that is needed to power on-board directed energy weapons and all electric aircraft subsystems. Currently, US Air Force requirements for future unmanned and manned systems are demanding propulsion capabilities which can sustain supersonic speeds as in Mach 1.5-3.5 across a complete flight regime, lift-off to landing, and deliver high power energy weapons with all electric sub-systems for aircraft function. Future aircraft concepts are demanding in excess of 1.0 megawatt of power which current turbine engine companies cannot deliver off of their present engine designs, largely because they are restricted by the reduction performance of gear boxes, drive shafts and the generator added on as an additional component which is not made by the OEM engine supplier.

In traditional gas turbine engines, the combustor/propulsor, dynamic components are designed to be in tension with heavy axial drive shafts (or spools), and gear boxes. These systems are quite heavy and typically limit the thrust to weight ratios to not more than 7 to 1.

Accordingly, a need exists for an engine design that is able to provide very high thrust to weight ratios, has optimized aerodynamic flight conditions across the entire flight envelope and can generate substantial surplus electrical power output.

A further need exists for a turbine engine design without a drive shaft (and its volume and weight constraints) that has optimize aerodynamic efficiency along with lightweight high temperature materials.

Yet another exists for new engine turbomachinary that utilizes new high power electromagnetics to electrically segment the bypass fan from the compressor and the turbine.

SUMMARY OF THE INVENTION

The Supersonic Magnetic Advanced Generation Jet Electric Turbine (S-MAGJET) described herein, and a subsonic derivative, MAGJET, integrate a gas power turbine, superconducting electric power and propulsion generation, and magnetic power flux field systems along with an ion plasma annular injection combustor which utilizes alternative petroleum-based fuel and combustion cycles to create a hybrid turbine turbomachine for aerospace propulsion. The propulsion unit is able to achieve a dramatic increase in horsepower, combustion and propulsion efficiency, and weight reduction. In addition, the turbomachinery structures may be disposed within an exo-skeleton architecture that achieves an increase in thrust to weight ratio with a concomitant increase in fuel efficiency and power generation over traditional gas turbine technology today. The S-MAGJET can provide a flight operation envelope with little or no off-design flight condition. The engine continuously adjusts the temperature, pressure and mass airflow requirements using an electromagnetic power management system architecture. With this system architecture, the engine performance may be controlled across the entire desired flight envelope, whether subsonic, transonic or supersonic flight conditions. With bypass fan(s), compressor stages and turbine segments controlled electrically in a shaftless turbine design, the S-MAGJET maximizes the propulsion efficiencies over a broader range of operating conditions compared to current art of turbine technology and at much higher thermodynamic and aerodynamic efficiencies.

The present invention discloses methods, systems, and apparatus for hybrid engine technology offer a highly efficient, both subsonic and supersonic, variable bypass (propulsor fan) ratio engine design. The engine operates electrically by generating a large amount of on-board electric power through its superconducting electric turbine ring generator system. The engine produces sufficient power to operate the multi-stage counter rotating, superconducting, dual ring motor electric bypass fans and superconducting electric ring motor axial compressor. Typically, the engine described herein may be in the 50,000-55,000 lb. thrust class as a supersonic engine, and 25,000-120,000 lb. thrust class as a subsonic engine, although other thrusts may be developed and used depending on the system requirements.

As used herein, the Supersonic Magnetic Advanced Generation Jet Electric Turbine (S-MAGJET) is the term used to define the supersonic hybrid engine embodiments described herein, and Magnetic Advanced Generation Jet Electric Turbine (MAGJET) is the terms used to define the subsonic hybrid engine derivative thereof also as described herein. S-MAGJET includes a power turbine portion that generates hot air exhaust and powers the one or more ring motor generators that generate the electrical power needed to power the other S-MAGJET components that may include a series of supersonic flow rotors and counter rotating diffusers to operate across supersonic inflow conditions, and that can be run independently of one another.

In the engine described herein, the electrical generation is provided by superconducting ring generators that are powered by the high velocity exhaust thrust from the combustor section of the engine. The bypass fan is a twin fan system in which one fan counter rotates with the other fan, which reduces aerodynamic swirl and drag. The bypass fan configuration is not constrained by a drive shaft, heavy gears and complex gear boxes, nor complex lubrication systems and it can be run at an optimal rotational speed so as to maximize its efficiency at any aircraft velocity, or altitude. The bypass fans running independently from the compressor can be run at much slower speeds than the compressor, this means a more efficient RPM for the larger diameter fan blade designs whether a low bypass fan design as in a supersonic engine or a high bypass fan design in a subsonic engine. Raising its efficiency dramatically is now possible in pushing air past the compressor core and power turbines, for thrust and the overall efficiency of the engine. Additionally, the lower operating speeds afford the use of wider blades, raising aerodynamic efficiency and thrust per horsepower, making the engine architecture greatly more efficient than the current art of engine designs. The electric compressor is designed with fewer stages than that of current turbine technology. The compressor is an axial, multi-stage design of 8 stages in a supersonic derivative, and 9 stages in a subsonic derivative of the engine technology. Three (3) low pressure stages and six (6) high pressure stages are present in the subsonic design, current art of turbines would take at least thirteen (13) compressor stages to compress a similar amount of incoming air. This is possible as each stage operates independently from one another, and can, as they are driven electrically, and each stage is more efficient. As the light weight superconducting ring motors for the compressor do not require a drive shaft, nor the bypass fans or the superconducting ring generators of the power turbine, a "hollow-core shaftless" tunnel is left in the center of the hybrid electric turbine which now carries additional bypass air. Bypass air as the major component of thrust, rather than the hot exhaust from the power turbine being utilized as thrust is a more efficient method of producing thrust for propulsion in turbines. Therefore, in S-MAG-JET, the majority of electric power produced off the power turbine via the superconducting ring generators is directed forward through a proprietary electric power management system to run the electric bypass fans and the electric compressor. This electrical independence of the bypass fan from the multi-stage axial compressor raises overall efficiency of the engine. This S-MAGJET as described herein also generates excess electric power. In the 54,700 lb. thrust class, which is 41,000 shaft horse power, the engine is able to generate 30.5 megawatts electric power, from the standpoint of the engine operating at cruise conditions, e.g., Mach 3.4 and 70,000 feet on a standard day, and in which 7.0 megawatts are reserved for running any of the onboard electrical needs of the aircraft, from aircraft health monitoring, guidance and control, avionics, electrical flight control systems to sensor arrays in military applications. MAGJET also produces excess electrical power and in the 25,000 lb. thrust call engine for regional jets produces 19.0 megawatts of power, utilizing 14.0 megawatts to run it and therefore 5.0 megawatts of additional surplus power. S-MAGJET and MAGJET have the generator systems as an integral part of the power turbine, made up of four stages located behind the combustor. In this engine class of 54,700 lb. thrust, it generates 30.5 megawatts, and utilizes 28.5 megawatts to run the engine and generate the desired thrust. This leaves 7.0 MW left over for such future systems in aircraft as heavily sensored environmental and health management systems, electric landing gear, all electric flight control and redundant systems, and advanced avionics suites which are now implementing the digital high ways in the sky guidance and control systems.

According to a first aspect a combustion engine comprises: (A) generally cylindrical frame having interior and exterior surfaces; (B) a plurality of arcuate blade arrays movably coupled relative to the interior surface of the cylindrical frame; wherein rotational characteristics of a first blade array relative to the cylindrical frame are different from rotational characteristics of a second, adjacent blade array relative to the first blade array.

According to second aspect, a method of operating a combustion engine comprises: (A) providing a shaftless engine having: i) a generally cylindrical frame with interior and exterior surfaces, ii) a plurality of arcuate blade arrays movably coupled relative to the interior surface of the cylindrical frame, and iii) a plurality of induction coils disposed about the perimeter of the cylindrical frame; (B) exposing at least one of the blade arrays to a combustion event; (C) converting kinetic energy from the combustion event incident on the blade array into rotational motion of the blade array relative to the interior surface of the cylindrical frame; and (D) converting mechanical energy from the rotational motion of the blade array into electrical energy by inducing an electric current in the induction coils with a magnetic field.

According to a third aspect, the method of operating a combustion engine comprises: (A) providing a shaftless engine having: i) a generally cylindrical frame with interior and exterior surfaces, ii) a plurality of arcuate blade arrays movably coupled relative to the interior surface of the cylindrical frame, and iii) a plurality of induction coils disposed about the perimeter of the cylindrical frame; (B) inducing an electric current in the induction coils to create a magnetic field; (C) exposing at least one of the blade arrays to the magnetic field; and (D) converting electrical energy from the magnetic field incident on the blade array into rotational motion of the blade array relative to the interior surface of the cylindrical frame.

According to a fourth aspect, a combustion engine comprises: A combustion engine comprises: (A) generally cylindrical frame; and (B) a plurality of engine elements disposed within the cylindrical frame and selected from the group comprising a compressor, bypass fan or turbine; wherein the plurality of engine elements are configured for rotational motion relative to an axis of the cylindrical frame but are not mechanically coupled to the cylindrical frame or each other.

According to a fifth aspect, a combustion engine comprises: (A) a generally cylindrical frame; (B) a turbine capable of generating electrical power; and (C) a plurality of engine elements disposed within the cylindrical frame and selected from the group comprising a compressor, bypass fan, combustor, or magnetohydrodynamic accelerator; wherein the plurality of engine elements are electrically, but not mechanically, coupled to the turbine.

According to a sixth aspect, a method of operating a combustion engine comprises: (A) providing a shaftless engine having: i) a generally cylindrical frame with interior and exterior surfaces, ii) a turbine comprising at least one arcuate blade array movably coupled relative to the interior surface of the cylindrical frame and a plurality of induction coils disposed about the perimeter of the cylindrical frame; and iii) a combustor for generating plasma exhaust comprising ionized molecules of a first polarity; (B) exposing at least one of the blade arrays to plasma exhaust; (C) converting kinetic energy from the plasma exhaust incident on the blade array into rotational motion of the blade array relative to the interior surface of the cylindrical frame; and (D) converting mechanical energy from the rotational motion of the blade array into electrical energy by inducing an electric current in the induction coils with a magnetic field.

According to a seventh aspect, a combustion engine comprises (A) generally cylindrical frame; and (B) a turbine disposed within the cylindrical frame and configured to generate electrical power, the turbine comprising: i) at least one arcuate blade array movably coupled relative to the interior surface of the cylindrical frame, ii) a plurality of induction coils disposed about the perimeter of the cylindrical frame; and (C) combustor for generating plasma exhaust comprising ionized molecules of a first polarity; wherein at least a portion of the blade array comprises a magnetic material having a magnetic charge opposite the polarity of the ionized molecules of the plasma exhaust.

BRIEF DESCRIPTION OF THE DRAWINGS

The above and further advantages of the invention may be better understood by referring to the following description in conjunction with the accompanying drawings in which.

DETAILED DESCRIPTION

Figure 1A:
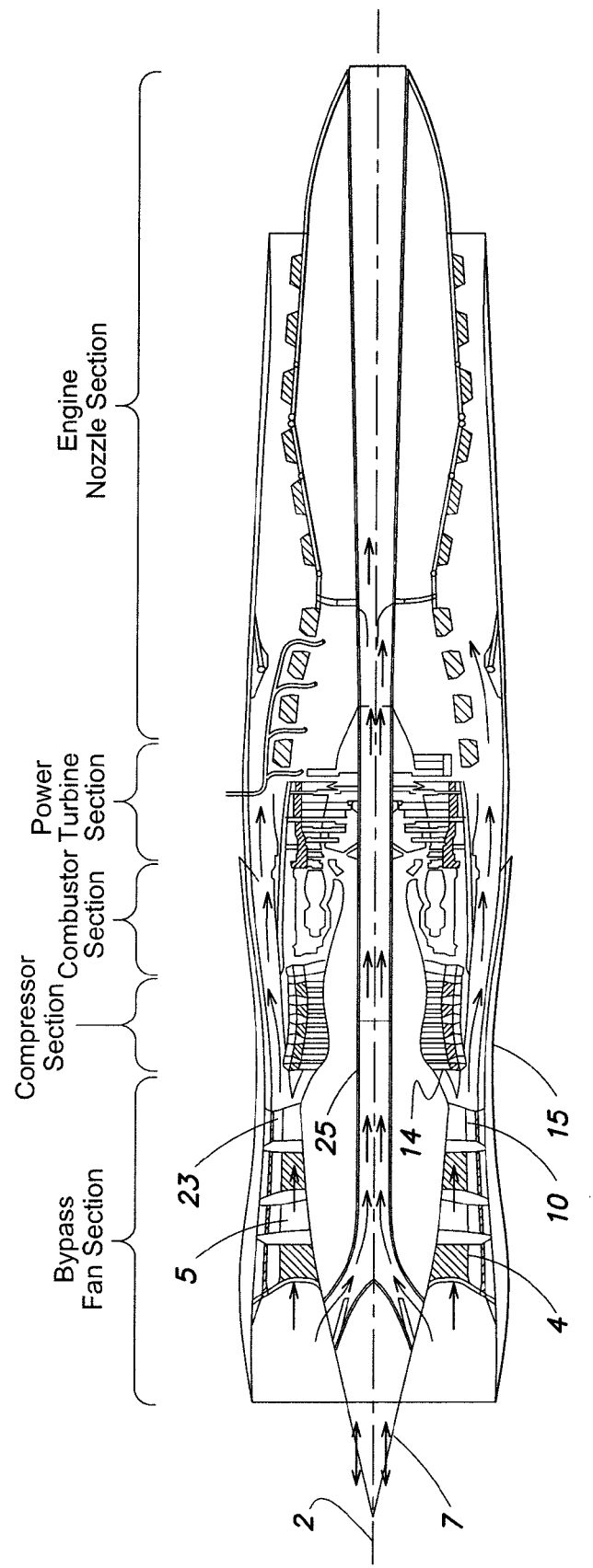
FIG. 1A-C are cutaway, cross-sectional view of an MAG-JET embodiment in accordance with the disclosure.
Figure 1B:
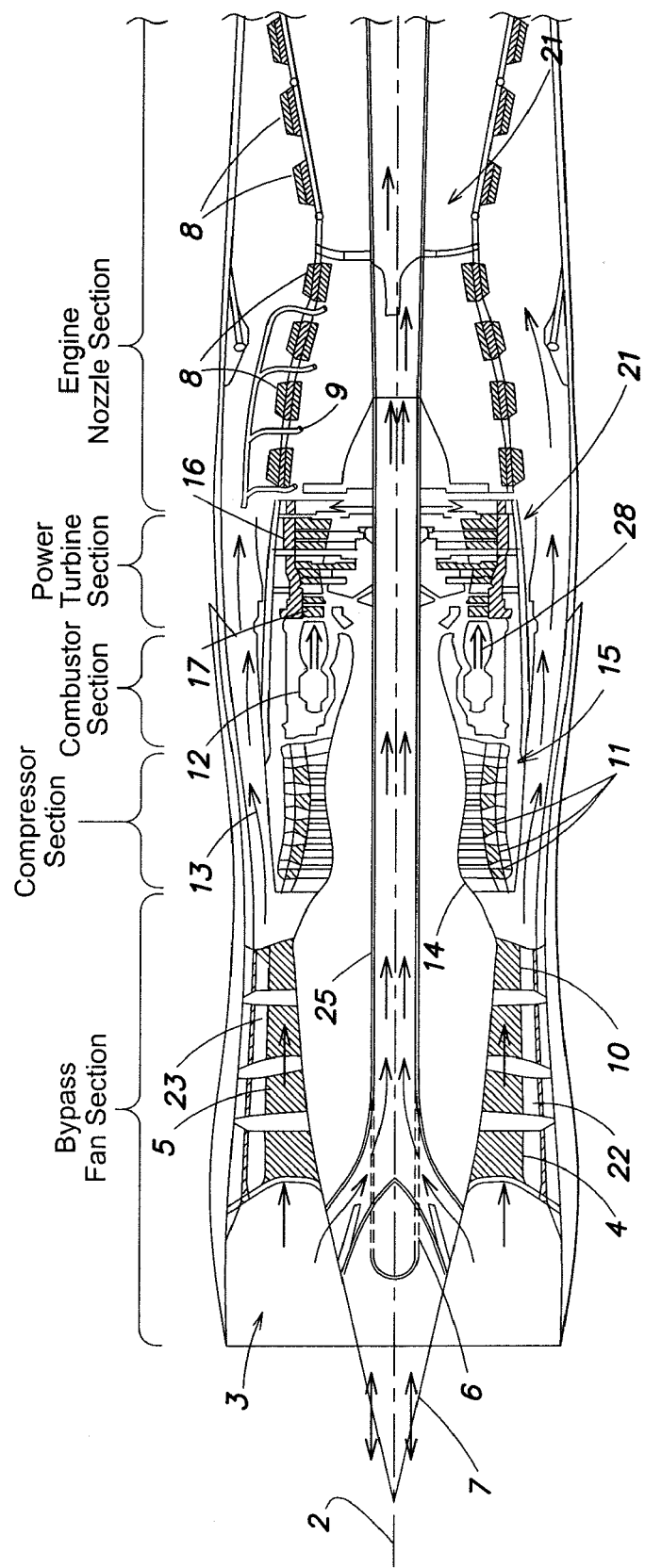
Figure 1C:
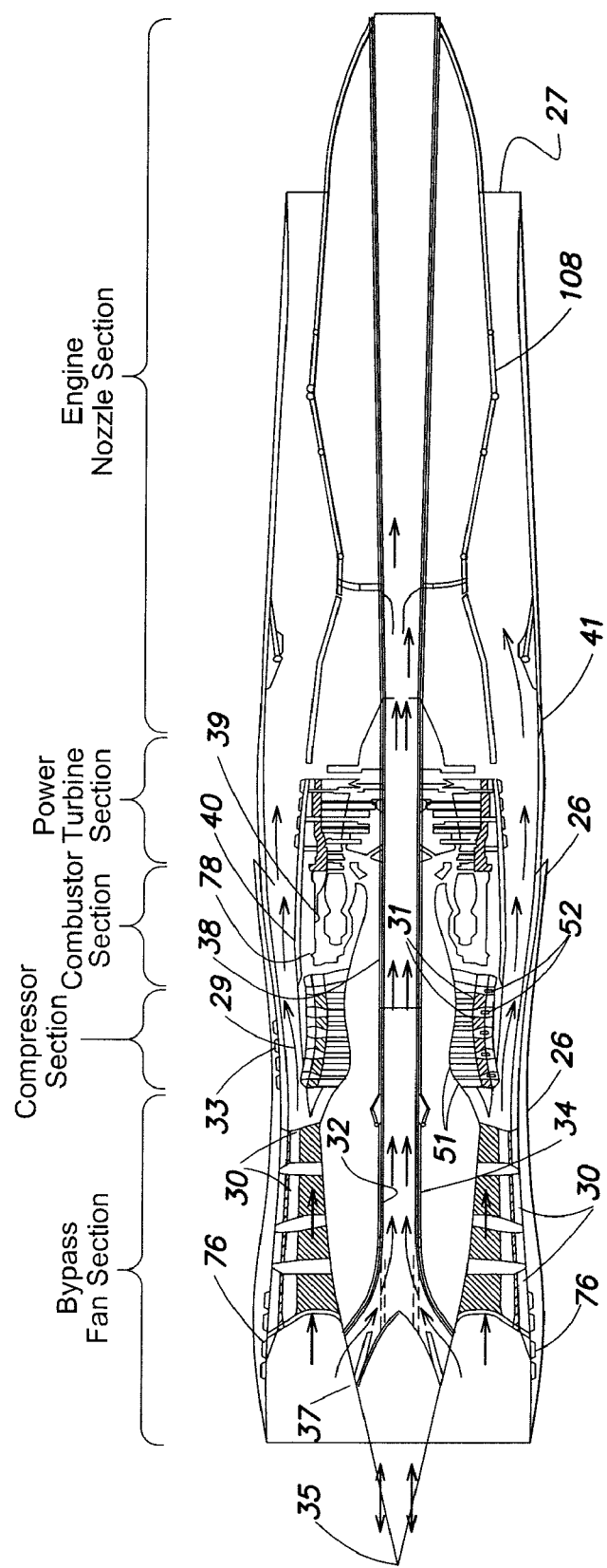

FIGS. 1A-C R. schematic representations of an aerospace supersonic aerospace gas turbine engine (1) in accordance with an exemplary embodiment comprises an outer casing or exoskeleton (15) extending the along an axial centerline axis (2). Exoskeleton (15) has a generally hollow cylindrical shape the specific dimension of which may be selected by the designer for specific parameters of high-speed flight. Exoskeleton (15) may comprise, in one embodiment an outer casing and an inner casing having a space there between. Turbine engine (1) further comprises an inlet section (3) into which air enters and is propelled in a bypass fan section (4) by the first of two counter-rotating bypass fans, after which the air is diffused and straightened through a counter-rotating diffuser (5) and further propelled by any second bypass fan (5). An aerospace ram (7) which moves in and out linearly along the axial centerline 2 and is attached to a slotted section of the bypass tunnel (6) to accommodate retraction and extension of the aero spike ram (7) to selectively accept bypass air/ram air to increase cooling or thrust or both, and to provide ionized seed flow to a magnetohydrodynamic (MHD) continuous electrode gas plasma generator/gas accelerator (8) at the rear of the engine (1) for seeding the air flow electrically through electric plasma seed electrodes (9). Turbine engine (1) further comprises swirl reducing diffuser (10) as a means of reducing mass air flow swirl, compressor section (11) for compressing air in the compressor section, a fuel combustor section (12) for combusting the compressed air received from the compressor section with a fuel and for generating combustion gases, a means for ionizing the fuel into a plasma via electrically charged and magnetic field generating fuel injectors (13) within the combustor (12), a means of extracting the kinetic energy from the combusted gases in a high speed exhaust stream exiting the combustor and turning a multi-stage, segmented power turbine (14). Turbine engine (1) further comprises power turbine generating electricity (16) for generating electricity utilizing high speed, superconducting, static electromagnets, embedded in the turbine section engine casing (15) and a means for simultaneously magnetically levitating the same. Turbine engine (1) further comprises a means of embedding permanent magnets in pairs (17) of turbine blades and generating continuous high strength magnetic field flux to generate electric power via the static superconductor electromagnets (15) and an exhaust nozzle through which the combustion gases are exhausted from the engine in a nozzle section which is in alignment of the MHD drive generator/accelerator (18). A section of electromagnets are sequentially spaced so as to accelerate the exhaust flow creating additional thrust which coming from the ion plasma fuel combustor (12) includes electric and magnetic field generating fuel injectors for generating ions having a positive charge (+) which then hit the accelerator electrode permanent magnet plates (which are negatively charged (−)) and are accelerated, increasing exhaust velocity and thrust, to control thrust on take-off and landing and for attenuating the exhaust flow volumetrically through the pulsed phased MHD electric accelerator (20).

Flowpath Overview

Ambient air enters the S-MAGJET supersonic engine (1) at the engine inlet section (3), is accelerated in the first stage of the dual counter-rotating bypass fan section (4), and is expanded, diffused volumetrically, and has aerodynamic swirl reduced, in the counter rotating diffuser (5). The rapidly moving ambient air is compressed in a multi-stage, counter rotating, stator-less compressor, the illustrative embodiment having eight stages, where the atmospheric pressure of the air is raised approximately 50 to 60 times. Subsequently, the temperature of the pressurized air increases dramatically to approximately 2250 Fahrenheit. The now high temperature air is forced into the ion plasma fuel combustor (12) under the velocity vector and compressive force generated from the compressor (11) and is ignited by an array of the electric and magnetic field generating fuel injectors (13) of plasma fuel combustor (12), to create molecularized, charged ion fuel combustion gases, i.e. a plasma, within the ion plasma fuel combustor (12). The combustion gases are utilized to drive the multi-stage counter rotating gas turbine (14) and integrated superconducting electric generator (14). In the illustrative embodiment, turbine (14) is made up of eight distinct, counter rotating power turbine stages, with a first set of two high pressure (15) power turbine stages followed by a set of four medium pressure power turbine stages (21), and then a set of low pressure turbine stages which are magnetically levitated as a complete system (16) thereby reducing drag and turbo-vane swirl. Additionally, the dual, counter rotating bypass fan (4), counter rotating single stage diffuser (5) and stator-less compressor are also magnetically levitated at (22) and (23), the high-speed superconducting multistage high pressure power turbine (15) is preceded, in a longitudinal and axial manner, by a single row of static, high pressure stator vanes. The stator vanes straighten exhaust flow, maintain enthalpy and kinetic energy levels and contribute to overall power extraction from the gas flow for the turbine and electric generation capability of the combined 8-stage power turbine (24).

The hollow core 25 extends for the axial length of the engine (1) and allows ambient air to pass without being subject to the actions of the bypass fan (4), the compressor (11), the combustor (13) or the power turbine generator (14). Further, the design of the engine (1) is such that a portion of the ambient air subjected to acceleration in the bypass fan (4) is directed, within the outer engine casing (26), but outside of the compressor, combustor and power turbine generator, to exit the engine through the mixed flow supersonic nozzle section (27) in conjunction with the exhaust combustion gases (28), and the bypass air moving between the outer casing of the engine and the inner casing of the engine core (29), and the bypass tunnel formed by the hollow core (25). When the engine is in operation, the various rotating elements of the engine, namely the dual counter rotating bypass fan (4), the multi-stage electromagnetic compressor (13), and the 8-Stage electromagnetic segmented power turbine generator (14), are maintained in position in the engine by magnetic levitation air bearings located at turbomachinery locations of the dual counter rotating bypass fan magnetic coils (22), the multi-stage segmented compressor levitation coils (11), and the electromagnetically segmented multi-stage power turbine levitation coils (16), respectively, such that the weight of the rotating elements is borne by the outer engine casing in the absence of an internal engine shaft. In the illustrated embodiment, static elements of the engine, as well as the rotating elements of the engine when not in operation, are supported within the outer engine casing by means of high speed arrestment pelton wheel systems in the bypass fan turbomachinery section (30), the multi-stage segmented compressor (31), and the electromagnetically segmented multi-stage power turbine.

The load bearing surface in the S-MAGJET is the outer casing of the engine and not a load bearing drive shaft as in current designs. Since all of the superconducting electromagnetic ring motor and ring generator systems are an integral part of the engine exoskeleton, the centripital mechanical load of the operating turbine is one of compression where all rotating machinery is stressed in a positive sense, being under mechanical compression. Thus, high performance, high temperature fiber reinforced ceramic matrix composites (CMC) may be utilized in the rotating machinery. The rotating components of the compressor including the diffuser, the stator vanes, rotating compressor blades, the electromagnetic trunion which houses the superconducting power generation coils, motor coils and magnetic levitation permanent magnets and Halbach Arrays are all under mechanical compressed loads. In compression, CMCs out perform superalloyed composites as used in current turbine technology by weight, strength, and high temperature thermodynamic resistance and thermodynamic cycling performance.

In S-MAGJET the load bearing surface is the exoskeleton, i.e., the rotating machinery spins against the outer wall of the hybrid engine where the magnetic levitation air bearings are located, thus the centrifugal forces developed as the machinery spins to generate power and is directed against the exoskeleton.

Inlet Section

Inlet section (3) comprises an aerospike ram (7) for alternatively permitting or preventing ambient air from entering the hollow core 25 of the engine. Extending or retracting of aerospike ram (7) relative to hollow central shaft in the forebody behind the aerospike ram either opens or closes the hollow shaft core via a plurality slotted gates (32) via electric actuators (33) which consists of an aerodynamically-designed double shaft of the hollow core.

Figure 2:
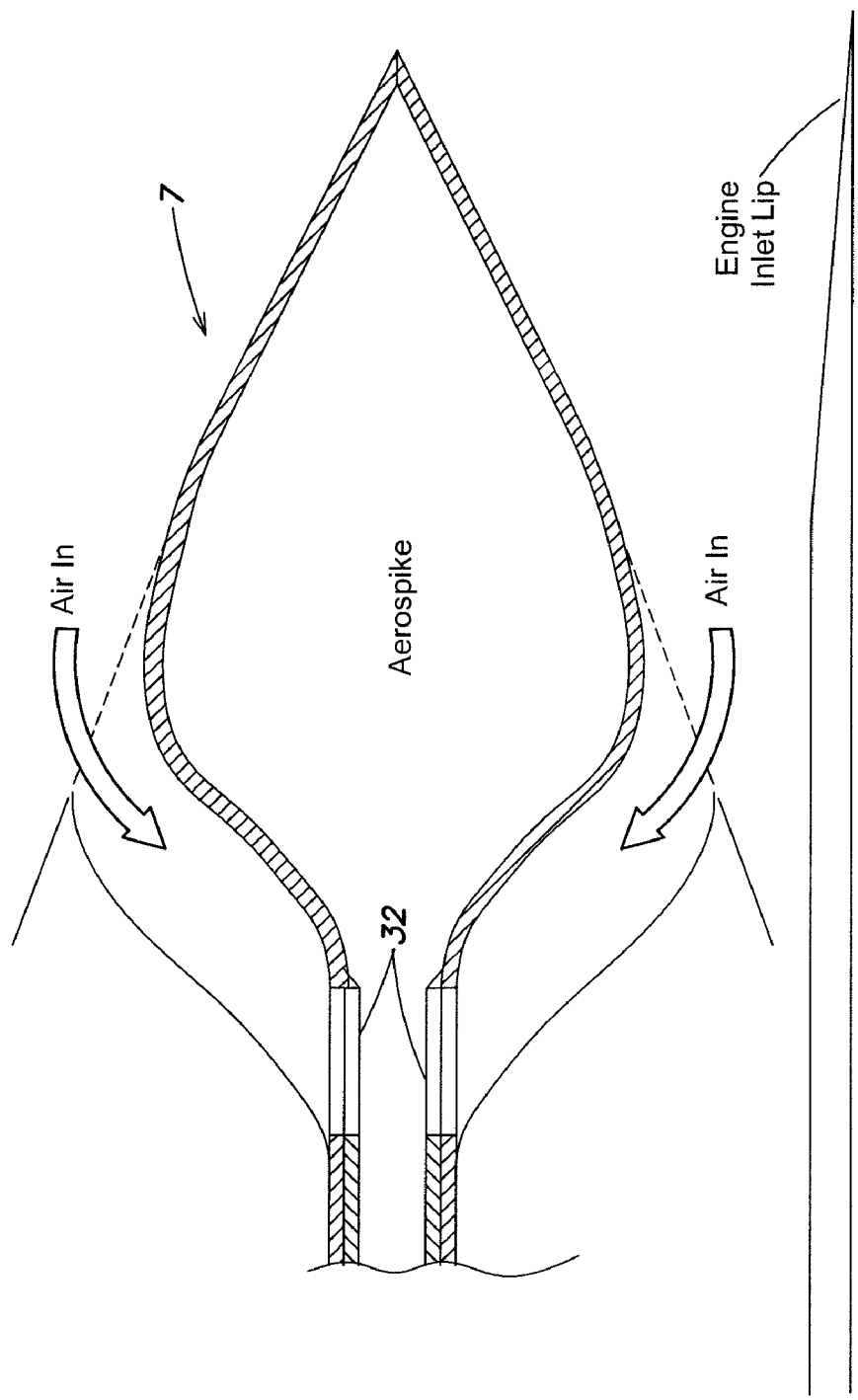
FIG. 2 is a conceptual cross-sectional view of an aerospike in iccordance with the disclosure.
Figure 3:
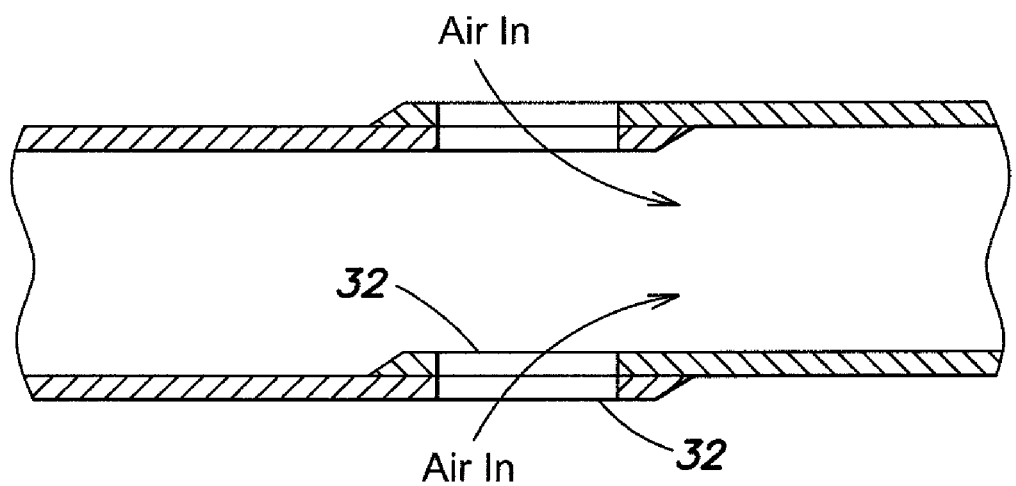
FIG. 3 is a conceptual, cross-sectional view of the aerospike inner shaft with the intake slots in an open position in accordance with the disclosure.

The point of air entry to the hollow core shaft is through an axially, extending or receding, aerospike which adjusts the amount of ambient air, under the control of electric actuators (33), into the inlet by moving in or out dependent on air speed, the amount of air needed for cooling and the required velocity and mass flow needed to maintain a given speed and altitude of the aircraft to which the S-MAGJET supersonic aerospike engine is integrated. Depending on the in and out axial motion of the aerospike attached to the hollow shaft, the axial slotted gates (32) are opened and closed. The hollow core has a double wall about gates 32 to obtain the sliding component axially to provide extension and retraction of the aerospike (7). The aerospike and axial hollow core shaft is articulated via a series of electric actuation drivers (33) to provide movement, and where the hollow core shaft is a smaller diameter aft of the slotted gates 32 and fits tightly into a larger diameter hollow core shaft forward of this position 34. The slotted gates, stationed radially about circumference (FIG. 3) of the hollow core shaft, when the aerospike is extended or retracted, opens (FIG. 3) and closes (FIG. 4) the slotted gates about the hollow core shaft (FIG. 2, element 32). When the aerospike is extended forward, the slotted gates are open and ambient air is allowed into the hollow shaft for cooling and increase of volumetric and mass air flow and a gap is formed between the trailing edge of the aerospike conical form and the leading edge of the conical body aft of the inlet lip (36).

The forward aerospike is generally conically shaped, with a tip (35) at the forward-most end of engine inlet 3 which forms a shock cone structure to manipulate the shock waves in terms of shock wave coalescing and shock train development where the magnitude (amplitude and frequency) has a negative impact on drag, aerothermodynamic heating, acoustic vibration, and the subsequent shock entrainment, all of which contributing to formation of back pressure, inlet un-stall and compressor stall during critical flight speed transitions, for example from Mach 2.5 to 3.5. The aerospike positioning is depicted in FIG. 6 exemplifying the formation of shock waves at different flight speeds and the attenuation thereof. Beginning with the aerospike fully closed and no inlet air into the central hollow-shaft bypass tunnel (FIG. 6A) where at Mach 1.0, shock waves begin forming above Mach 1.1 and near the very edge of the inlet cowl, and inside the inlet cowl, causing a supersonic wave formation shock train that propagates past the bulge of the supersonic aerospike. The aerospike offers a reduction in velocity of inlet mass air flow which is required prior to reaching the bypass fan, but more importantly the shock waves cause back pressure within the inlet and internal to the inlet as these multiple shock progress toward the dual counter-rotating bypass fan (4). Despite the velocity of the inlet air being slowed the supersonic shocks propagate and multiply creating shock trains which can cause low frequency acoustic vibration. The invention the S-MAGJET Supersonic Aerospike Engine attenutates the low frequency, multiple shock trains forming at the inlet of the engine, and, by moving forward and outward axially, dissipitating the shock train by drawing a portion of the inlet air into the central hollow shaft via the shaft gates opening (32) as depicted beginning in FIG. 6B, by approximately one third. In this position the first shock train is removed from the inlet. With the shaft gates open, simultaneously, bypass air moves down the central hollow core shaft 25 of the engine, providing cooling to the combustor and the power turbine, increasing the efficiency of combustion. As the aero spike extends forward to compensate for cooling via the core bypass shaftless tunnel, and thereby reducing the number of shocks entering the inlet, it also adjusts for the position of the shockwaves and reduces the impact angle moving from acute angles to obtuse angles as observed with the aerospike moving from the approximately one-third position in FIG. 6B, to the approximately two-thirds position in FIG. 6C, and finally the fully extended position in FIG. 6D.

The rearward portion of the aerospike (7) and the entry gates formed axially in the circumference around the hollow core shaft are designed in a complimentary fashion such that the rearward portion of the aerospike may be positioned behind and inside the front portion of the aerospike and close the entry gates to prevent the ambient air from entering the hollow core shaft tunnel. Further, the supersonic aerospace may be extended out of and away from the rearward portion of the aerospike in such a fashion to permit ambient air to enter the hollow shaft entry gates intermittingly spaced around the shaft specifically to move bypass air down the shaft and to attenuate back pressure at the inlet and reduce shock train frequency. The forward hollow shaft engine core (25) fits either inside or outside of the diameter of the rearward hollow shaft engine core (38), and is attached to the rearward portion of the aerospace and may be moved either out or in to open or close off the hollow shaft entry gates port to the ambient air. Such shaft is not continuous, but contains a multitude of gates (6), (32), and (36) which, as the shaft is extended, permit ambient air to pass through the shaft from the entry port into the hollow core.

The inner diameter of the inlet section is greater than the outer diameter of the supersonic aerospike at center and which centers inside the inlet cowl plug and is larger than the outer diameter of the other engine components. The diameters of the supersonic aerospike, the hollow shaft entry gate ports, the hollow core shaft, the electric compressor mechanism and compressor blades and stages, the power turbine operation and its stages, and the other elements of the engine are adjusted relative to each other so as to permit the optimum operation of the engine, in subsonic, transonic and supersonic modes of operation. In subsonic and transonic modes of operation, the supersonic aerospike is retracted to close off the hollow shaft entry gate ports of the engine such that all of the ambient air entering the inlet is directed into the bypass fan section of the engine.

Bypass Fan Section

The components of the bypass fan section include two alternating rows of bypass fan blades and diffuser blades, such that the forward most row is a row of bypass fan blades and the aft most row is a row of bypass fan blades. The row of blades in between is a set of diffuser blades, such that the rows of fan blades and diffuser blades rotate in opposite directions.

The bypass fan blades and the diffuser blades are suitably secured to an inner ring that forms a portion of the circumference of the hollow core of the engine and to an outer ring. In the case of the counter rotating row of diffuser blades, which constitute a rotating drag and swirl-reducing diffuser, the outer ring forms a part of the outer engine casing. In the case of the rotating rows of bypass fan blades or diffuser blades, there is a perimeter ring to which they attach where the outer portion of the tips of the bypass fan blades and diffuser blades contain moldable high temperature ferrous permanent magnets inside the blades which continuously are molded to the perimeter inside ring, which lies in close proximity and rotates inside an outside perimeter ring and which is magnetically levitated against the fixed outside ring which is a part of the engine casing. The outside perimeter ring contains superconducting induction coils such that the entire bypass fan blade or diffuser rotor assembly with their respective inner perimeter ring assembly constitutes the rotating element of a superconducting ring motor. The stationary element of each ring motor within the outer perimeter ring consists of coils of superconducting wire maintained at a constant temperature of not less than −307 degrees Fahrenheit (20 Degrees Kelvin) and through which an electric current is passed, thus creating a magnetic field through which the perimeter of the inner rotating ring element (the bypass fan blade or diffuser blade rows) rotates within the outer rotating ring element.

The inducement of an electric current in the coils located at the perimeter of the bypass fan blade rows and the diffuser blade rows causes the perimeter of theses blade rows, which are attached to their expected inner perimeter rings, to rotate in response to the manipulation of the magnetic field around the circumference of the blade row. Manipulation of the magnetic field is achieved with the superconducting motor coils in the outer perimeter ring, which lies in close proximity to the inner perimeter ring to which the balked rows are attached and the permanent magnets are embedded into the tips. In the illustrative embodiment, the inner portion of the rows of blades (that portion surrounding the hollow core) is designed so that the cross section of the channel through which the air passes in the bypass fan section is reduced from front to rear in a fashion similar to that shown in FIG. 3. Because of their shape and arrangement, the rotor blades accelerate, when rotating, The velocity of the ambient air. By design, the rotating diffuser blades increase the pressure and decreases the velocity of the air flow between the rows of rotor blades so as to increase mass flow which is the desired product equivalent for thrust up through the low supersonic condition of S-MAG-JET or Mach 1.2. The counter rotating diffuser blade row (counter to the bypass fan blade rows) re-directs the air away from the turbulent flow created by the first bypass fan stage, expands the air and increases pressure, so that the rearward bypass fan blade row may maximize gain increases in the mass flow and velocity of the air, and is accelerated by the fan blades to exit the rear bypass fan with the least possible turbulence.

Air leaving the bypass fan section of the engine is divided into two air streams. A first air stream, the bypass air stream (29), passes around the compressor, the combustor, the power turbine and its perimeter superconducting generators. The second airstream is directed into the multistage magnetic compressor (11). The bypass air stream (29) provides a large mass flow of air at low velocity and high volume, and, hence, high thrust at low speed to assist in rapid acceleration from take off up to Mach 1.0. Additionally the bypass airstream provides cooling to the ion plasma compressor both internally through the rearward hollow shaft engine core (38) and externally (40) in the mixed-flow bypass duct components of the engine. In addition, under the appropriate circumstances, bypass air may be removed from the bypass air flow and vented to the outside atmosphere, by a controlled bypass air vent (41).

Compressor

The components of the compressor section include a plurality of rows of compressor blades, each of which rotates in the direction opposite to that of the preceding row of rotor blades (51). Each row of compressor rotor blades is suitably secured to an inner ring that forms a portion of the circumference of the hollow core of the engine and to an outer ring. A stationary perimeter ring external to of each blade row and adjacent to the engine casing contains superconducting propulsion induction compressor coils of a ring motor. Such coils are maintained at a constant temperature of approximately not less than 20 degrees Kelvin with liquid hydrogen (52) such that the entire compressor rotor outer ring assembly constitutes the fixed element of the ring motor. Each compressor blade row is a rotating element of each ring motor, consisting of permanent magnets, thus creating a magnetic field through which the perimeter of the rotating element, e. g. the blade row, rotates within the superconducting propulsion induction compressor coils. When an electric current is passed into the induction ring motor coils, a magnetic field is induced, causing the perimeter of the blade row to rotate in response to manipulation of the magnetic field around the circumference of the blade row.

The compressor blade rows, and the spacing between the blade rows, are arranged such that no intermediate stationary stator blade rows are required to straighten the compressed air flow at any given velocity, and that the counter rotating stages of each compressor row achieve the removal of aerodynamic swirl, further achieve higher compression ratios with fewer stages within the engine. Without stationary stator stages, compressed air is counter compressed in each follow-on stage, where the kinetic energy of the accelerating air and the increase in the endothermic conservation (thermodynamic conservation and air temperature rise) raises the stator stage compression ratio. This design of the magnetic compressor offers a simpler architecture and lower weight since fewer stages are used.

The rotating turbine blade pair structures are fabricated out of ferromagnetic material which form a vane disk assembly vane disk assembly comprising of a ring with an evenly spaced array of aerodynamic vanes affixed on either the outside (47) or inside (43) diameter. Two of these turbine vane assemblies are affixed together with one set of vanes oriented such that their centers align with the gaps in the other vane disk assembly (97). The two vane disk assemblies are spaced apart by a nonmagnetic spacer ring (98). In alternative embodiments, a larger, even number of vane disk assemblies may be utilized.

A stationary, coaxial solenoidal coil is arranged adjacent to the vane disk assemblies on the opposite side of the ring from the vanes. This solenoidal coil may be fabricated of a normal conducting material or a superconducting material and may be surrounded by a ferromagnetic ring having a C-shaped cross section, the opening of which face us the vane disk assembly. When energized, this coil supplies magnetic flux which flows out though one vane disk assembly, through a stationary armature assembly located opposite the rotating vane assembly, and returns through the other vane disk assembly. The optional C-core provides a low reluctance path to complete the loop of magnetic flux.

A stationary armature assembly is affixed facing the vane disk assemblies (99). The armature assembly is of unique configuration where a specific number of poles and wiring are used to create a switched reluctance rotating electric machine using the aerodynamic rotating turbine vanes as magnetic pole features; with this design the armature assembly does not necessitate the use of conventional iron teeth, and the ferromagnetic structure may be of a laminated type or sintered ferromagnetic material type (100). Conventional iron teeth are replaced with a non-magnetic and non-conductive material instead. The armature coils are fabricated from superconducting ribbon using many layers of the ribbon, of thin thickness, fabricated into a cabled superconductor. Backing iron may be used or may be replaced with a non-magnetic material as a support structure.

The engine functions as a superconducting motor if the vanes need to be propulsed as in the compressor section of the turbine to compress a fluid flow such as air for combustion, or as a superconducting generator as in the power turbine section of the described S-MAGJET, driven by fluid flow in the hot exhaust stream coming from the ion plasma combustor in the engine and generating electric power. Such result may be achieved by energizing the solenoid coil with a direct current in the static armature at the perimeter. In the case of the compressor, an appropriate driving voltage and current coming form the power turbine is applied to the armature assembly to drive the vanes as a superconducting motor/compressor, or electric power is available at the superconducting armature terminals (101) if the machine were to be used as a generator/turbine. The rotating vane assembly may be supported by a magnetic bearing approach (16 and 48).

By varying the speed of each turbine stage row interdependently, the kinetic energy extracted from the combustor exhaust flow and transformed into mechanical energy, and, hence, thrust and electricity may be optimized and operational speed timed perfectly to performance requirements of the engine regardless of the speed, altitude, air density, of which the aircraft is operating.

Stationary diffuser blade rows are located between The high pressure section and the middle pressure section and the low pressure section of the power turbine, and at the beginning of the nozzle section. The stationary diffuser blade rows serve to direct the air flow and maintain its velocity, so as to increase the efficiency of the power turbine blade rows to extract energy from the exhaust stream, thereby improving engine performance and eliminating turbulence. The inner portion of the rows of blades, i.e. that portion surrounding the hollow core, are designed such that the cross section of the channel through which the air passes in the compressor section is varied from front to rear to achieve an optimum velocity and pressure of the air flow. The design of the rotor blades is such that the rotor blades remove energy from the exhaust gas.

Figure 4:
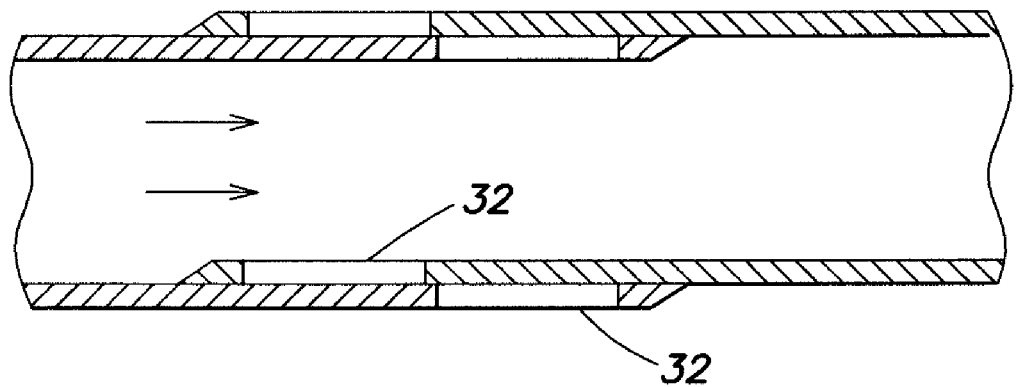
FIG. 4 is a conceptual, cross-sectional view of the aerospike inner shaft with the intake slots in a closed space position in accordance with the disclosure.

According to the illustrative embodiment, to control compression, i.e. the compression ratio, and, hence the speed of each compressor, a control processing systems is utilized on a stage by stage basis as illustrated in FIG. 4, where each stage of the compressor has a compressor stage controller (304, 306, 308, 310 . . . nth) for any given plurality of compressor controllers. In this embodiment, a controller is located at each stage location, and a primary management controller for all the compressor stages (302) may be located at the central engine control system. Each compressor stage controller manages an input signal and a power signal from the central engine control systems.

Combustor

A Combustor 53 in the illustrative embodiment is an ion plasma combustor of annular cylindrical design as illustrated in FIG. 7A-9B. By means of an electric current provided by the turbine generators (54), fuel is injected into the compressed air flow through a series of ion plasma, dual mode (55) fuel injectors (56) which are located around the perimeter of the annular combustor. The annular shape of a double lip (57), with the fuel injectors sitting inside the double lip provides smooth transition (58) of the heated compressed air from the compressor, into the double lip and dissipates it into the multiple fuel injector discs (59) which surround each ion plasma combustor dual port (60) and single port fuel injector (61), which then cover the periphery (62) of the annular combustor. Each injector provides both a plasma coil generator made up of electric coils (63) and a permanent magnet to create the magnetic field (64) through the forebody of the injector (65) which holds the circular array of permanent magnets. The fuel is discharged under pressure from the ejector and is ionized by the plasma coil generator (63) and is then placed and controlled by the electromagnetic field created by the magnetic field array of the injector (64). Each combustor injector is made up of a fuel feed line (66), a fuel pump (67), a fuel filter chamber (68), and a fuel charge reservoir (69). Electric current from the high speed superconducting static electromagnetic 2-stage high pressure power turbine (15) provides electric power to a ground cable (70) and a direct current (DC) 3-phase charge line (71) which runs internally to the inner wall of the injector.

Combustor 53 comprises a series of magnetic flame holders, encased in high temperature ceramic coatings along the perimeter of the outside circumference of the transitional wall of the annular combustor (72), and a series of electromagnetic field ionization coils on the inner annular ion plasma casing wall (73), opposed to and opposite from the magnetic flame holder series, which collectively control the plasma mass flow, ion plasma fuel decay rate, fuel ionization density, electric charge, toxic emissions ($CO_2$, $SO_2$, $NO_2$) and velocity of the combustion gases derived from the complete combustion of the plasma fuel as it exits from the front end of the combustor to the rear of the combustor where the magnets are encased in high temperature ceramic coatings along the perimeter of the outside circumference of the annular combustor and the inner transitional wall of the annual combustor.

The magnetic and electric flame holder (73) and combustion device systems (72) and manage the shape of the combusting flame front of the ignited plasma fuel/air mixture, which becomes ionized by the initial electromagnetic field charge at the injector and forms, at a very high temperature (2800 F) and high velocity (1850 ft/sec.). The plasma (fuel molecules holding a positive charge) then moves as a combustion front, moving from the front to the back of the ion plasma combustor, evolving the combustion process of consuming all the carbon based fuel through the superior atomization process which is catalyzed by the formation of the electric charged plasma. As the combustion front moves, the magnetic and electric flame holder and combustion device systems (72) and (73) retard the decay rate, which typically would follow a specific decay rate based on plasma density and rate of electric discharge, and sustain the electric charge so that may stay as a high speed plasma flow and benefit from being accelerated in the segmented electromagnetic plasma accelerator plate nozzle (19).

Upon combustion, the exhaust air expands and enters the turbine generator of the engine (1). An additional feature of the combustor is the cooling effect provided by the air passing through the hollow core in the center of the combustor (74), the design of which hollow core may be varied at the combustor to increase the cooling effect of the hollow core air flow.

Power Turbine

Figure 10:
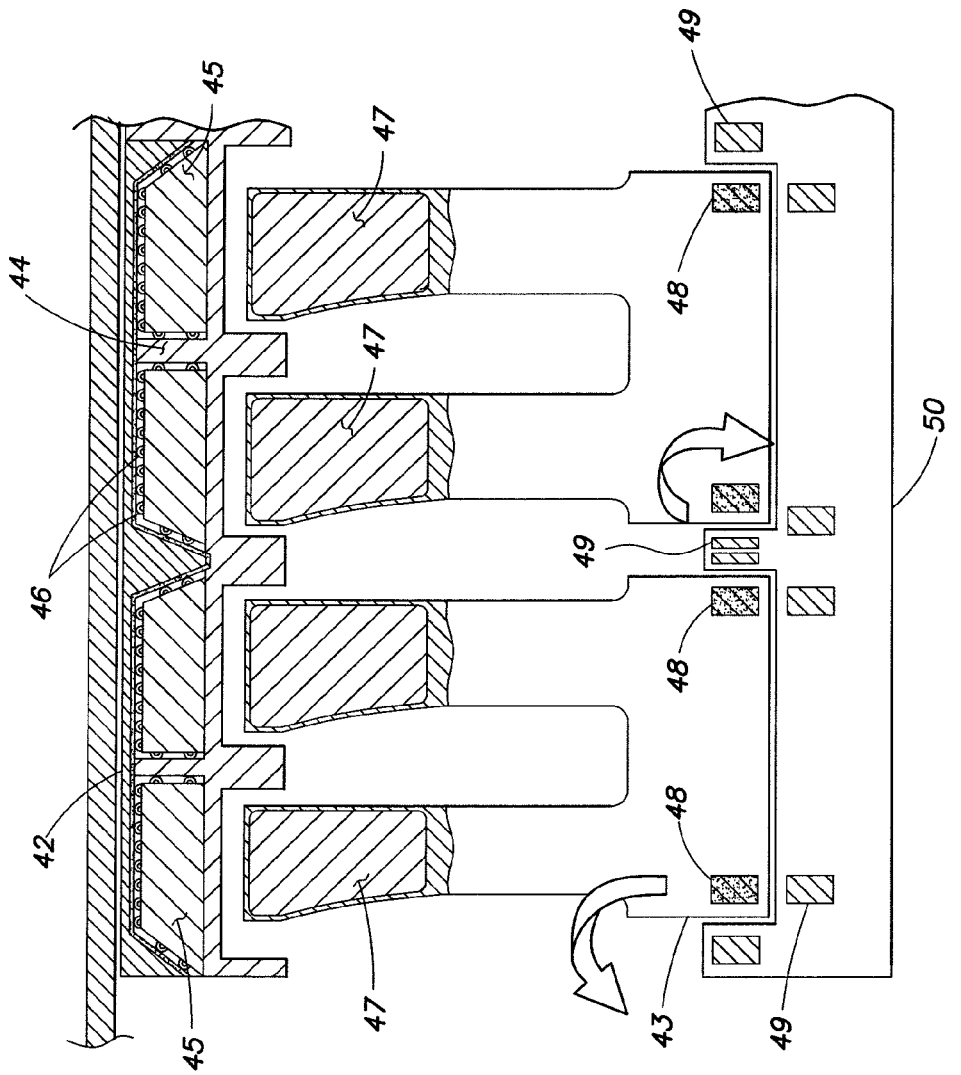
FIG. 10 is a conceptual, cross-sectional view of the superconducting turbine rotor blade power generation pairs in accordance with the disclosure.
Figure 11:
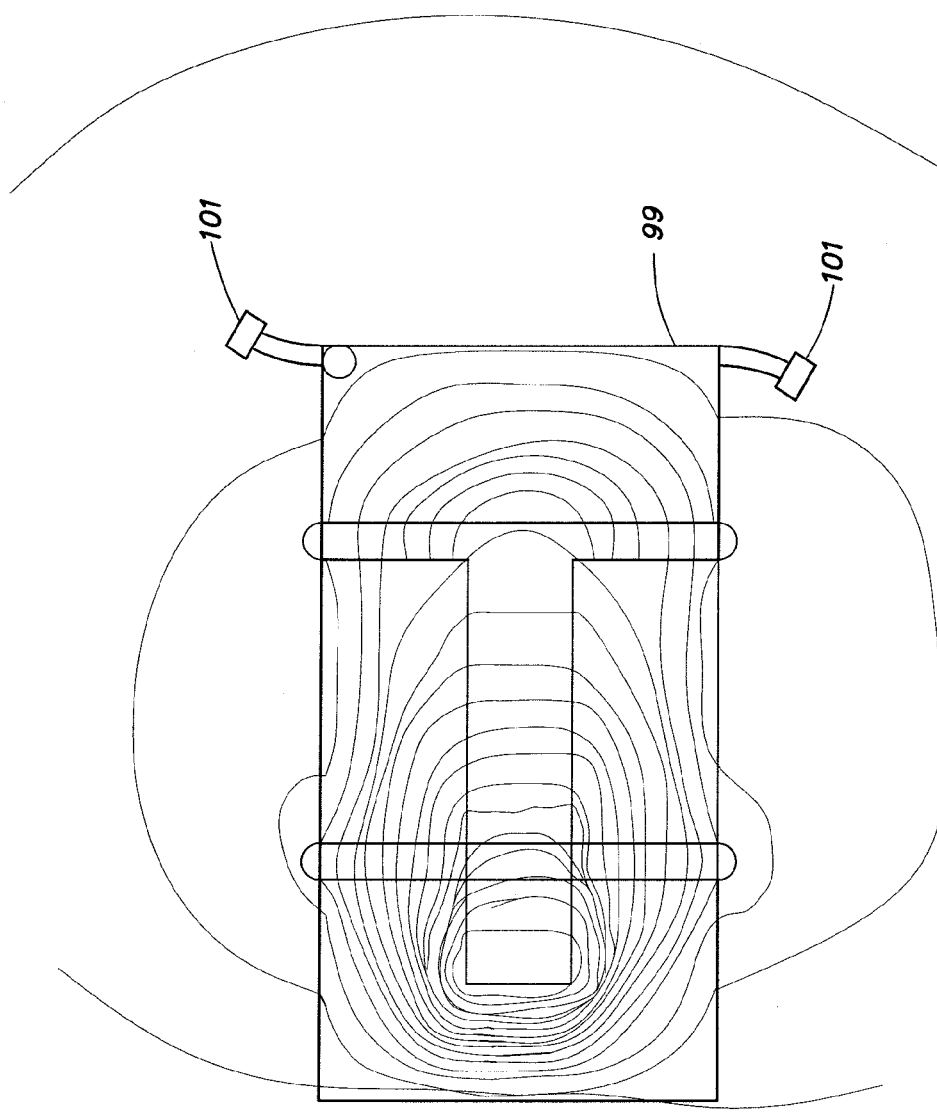
FIG. 11 is a conceptual diagram of the rotor blade power generation pairs of FIG. 10 relative to the induction coils and illustrating the magnetic flux pattern formed therebetween.
Figure 12A:
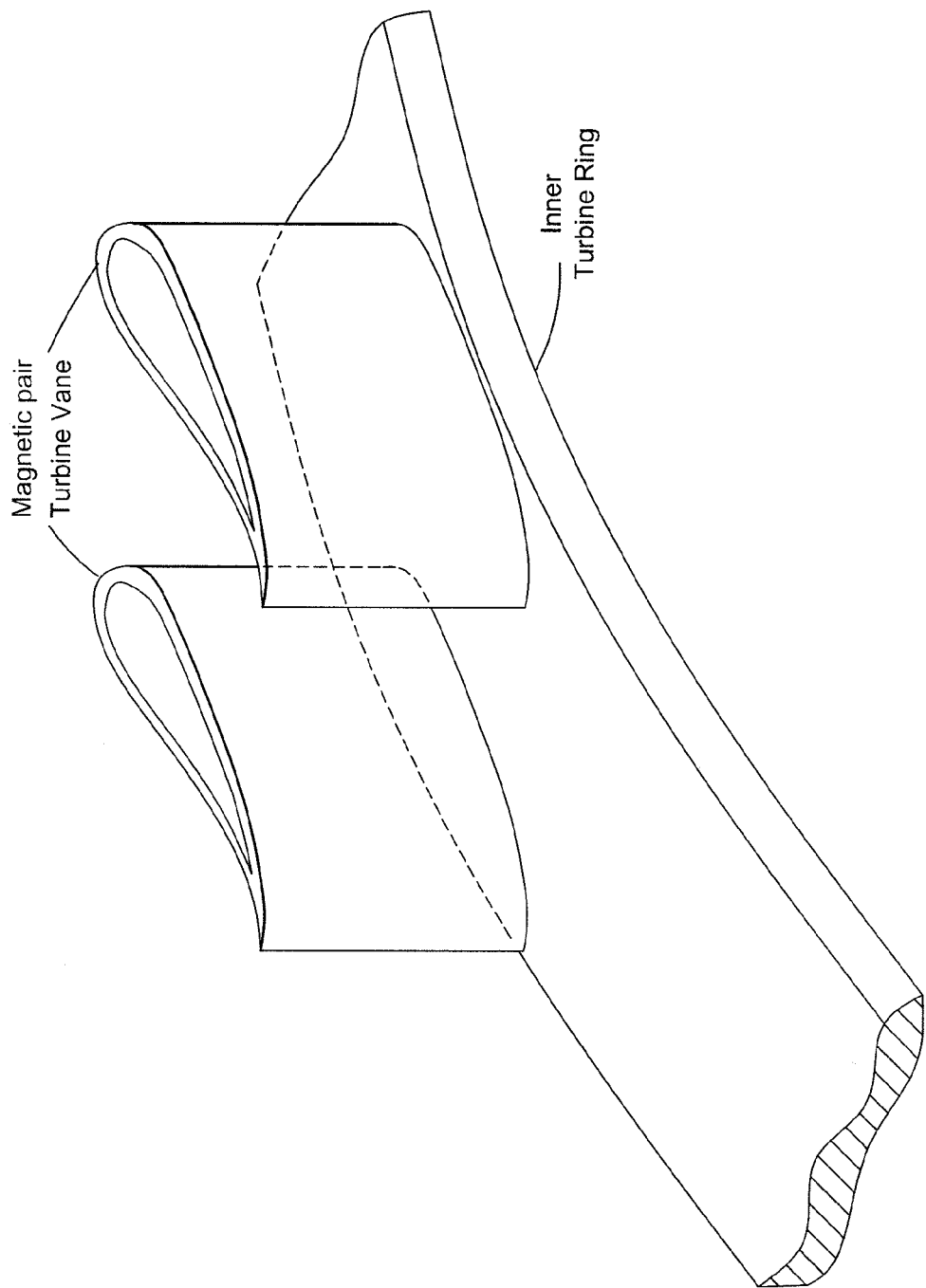
FIGS. 12A-C are perspective, top and side transparent views, respectively, of a turbine vane pair in accordance with the disclosure.
Figure 12B:
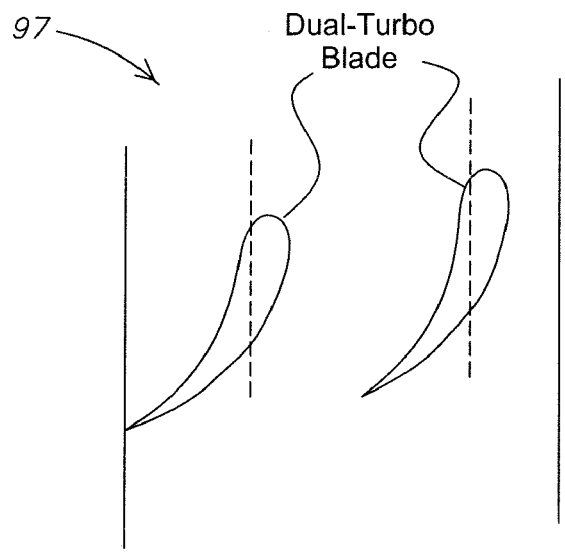
Figure 12C:
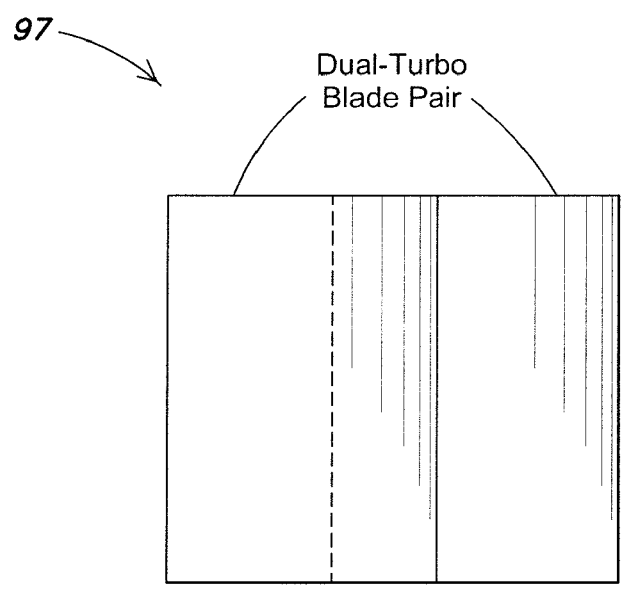
Figure 13A:
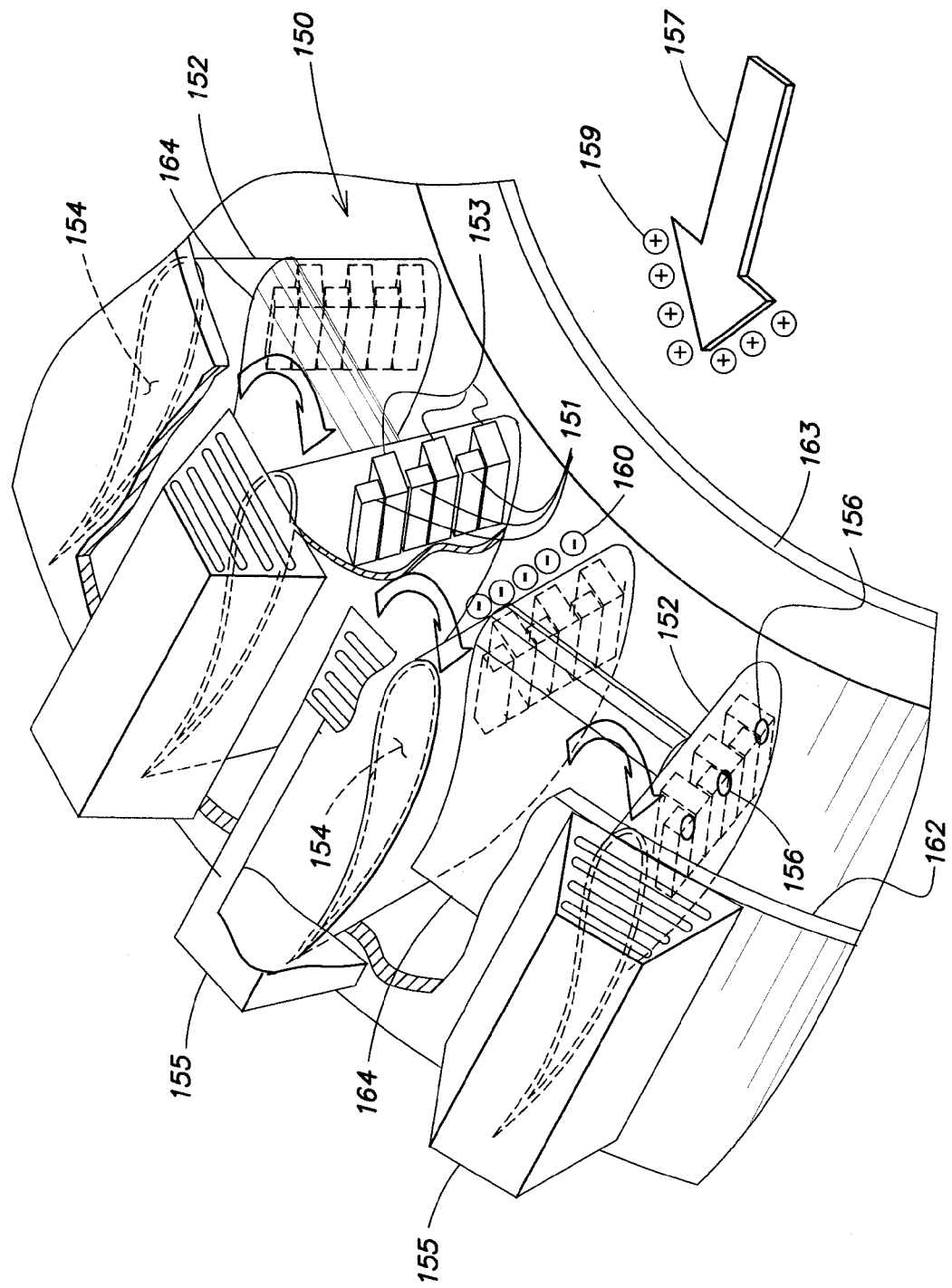
FIG. 13A is a perspective, partially transparent view of a turbine vane in accordance with the disclosure.
Figure 13B:
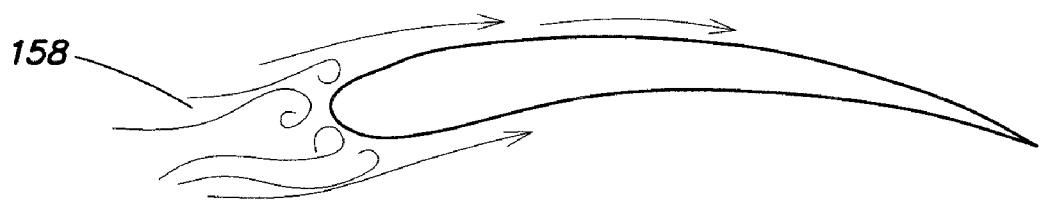
FIG. 13B is a top, cutaway view of a prior art turbine blade showing of airflow around the leading edge thereof.
Figure 13C:
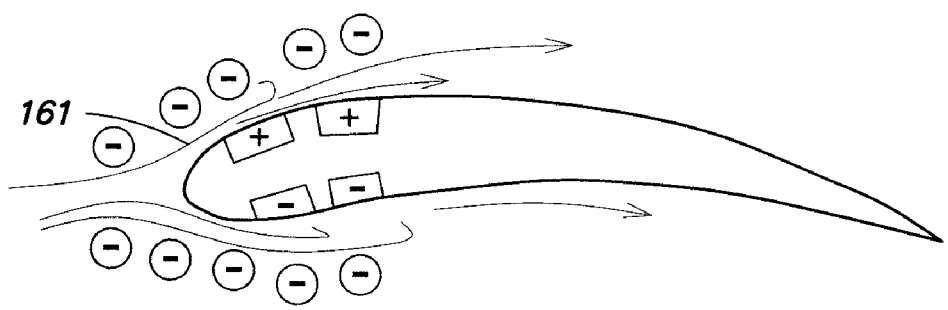
FIG. 13C is a top, cutaway view of a turbine blade showing of airflow around the leading edge thereof in accordance with the disclosure.

The components of the power turbine section comprise a plurality of six rotor stages, arranged in three pairs of rows, each of which rotates in the direction opposite to that of the preceding row of rotor blades shown in FIG. 10. Each row of rotor blades is suitably secured to an inner ring that forms a portion of the circumference of the hollow core 25 of the engine (43) and to a static intermediate outer perimeter cooled casing and ring (44). The static outer-perimeter ring of each turbine blade pair row contains superconducting power generation induction coils (45) such that the entire rotor assembly constitutes the rotating element of a superconducting ring generator. The stationary element of each ring generator consists of coils of superconducting wire maintained at a constant temperature of not less than approximately 20 degrees Kelvin (−293 degrees Fahrenheit) through superconducting cooling coils carrying liquid nitrogen (46). The superconducting coils are bathed in the liquid hydrogen coolant within a static intermediate outer perimeter cooled casing (44). The rotational direction of the turbine blades with their ferrous neodinium permanent magnet turbine blade cores passing the electromagnetic superconducting coils in the static superconducting power generation coils generates a high density electromagnetic field from which an electric current can be pulled and used as an electric power source for the aircraft.

Figure 5:
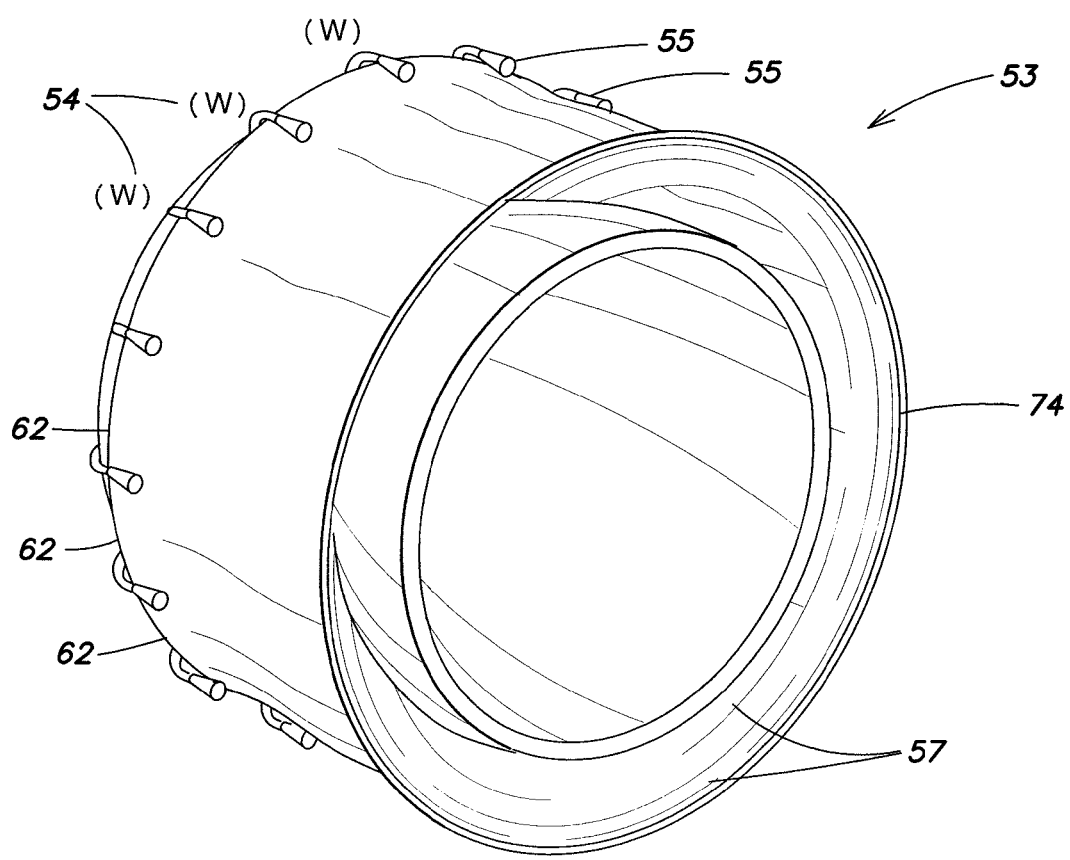
FIG. 5 is a perspective view of an ion plasma combustor in accordance with the disclosure.
Figure 6B:
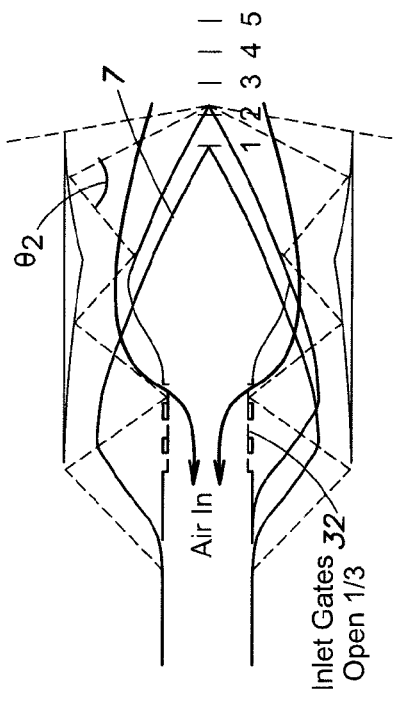
FIGS. 6A-D are conceptual, cross-sectional view of the aerospike relative to the engine inlet in various positions.
Figure 6D:
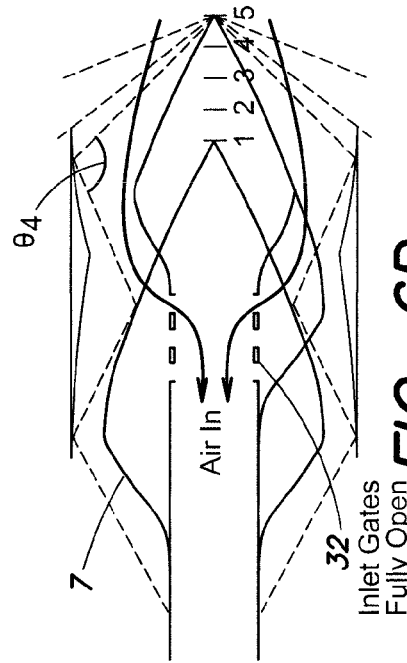
Figure 6A:
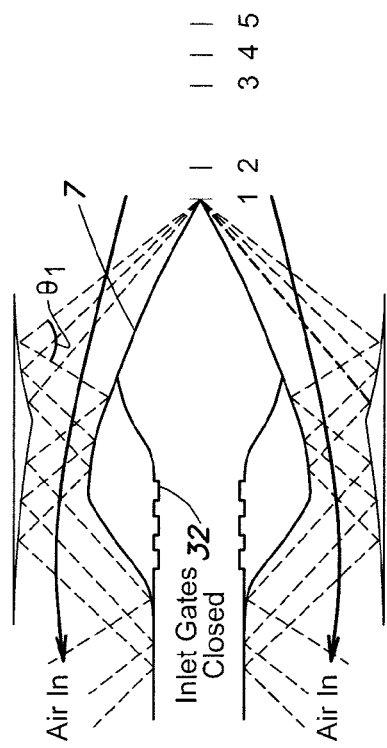
Figure 6C:
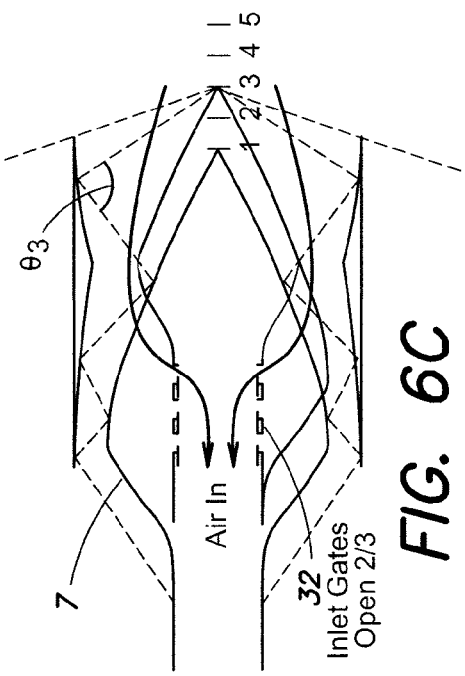
Figure 7B:
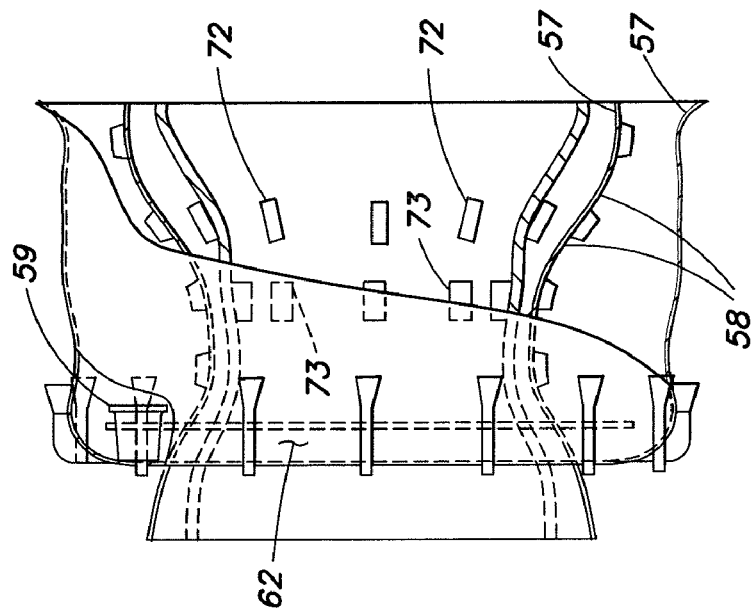
FIGS. 7A-B are front and side transparent views, respectively, of the plasma combustor of FIG. 5.
Figure 7A:
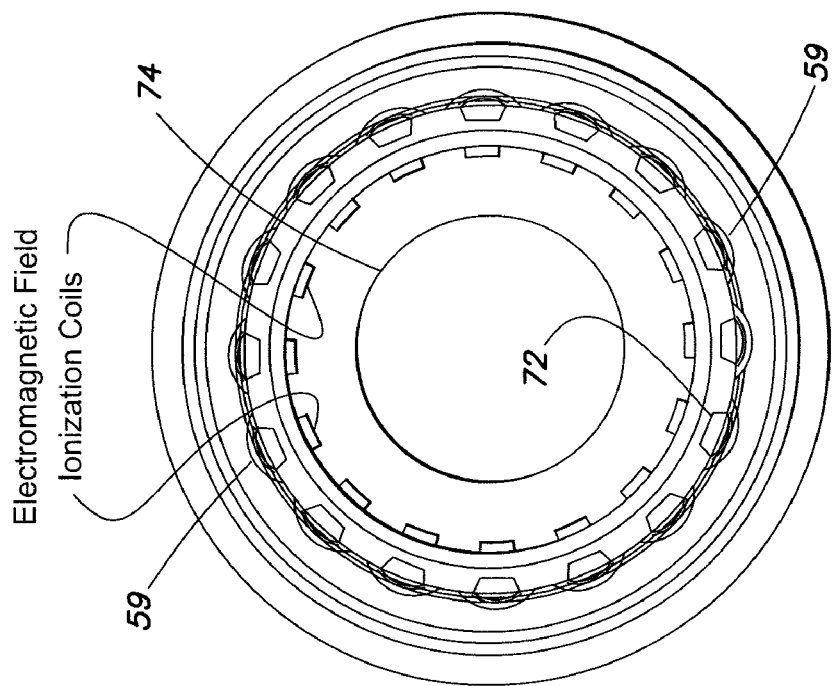
Figure 8A:
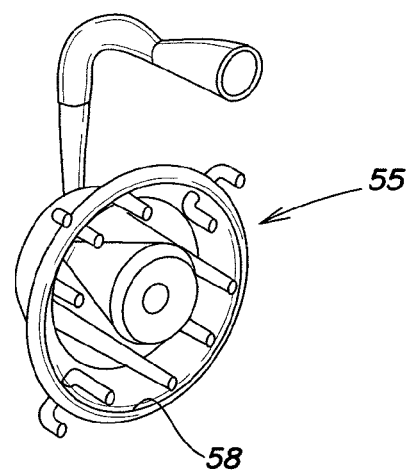
FIGS. 8A-B are perspective and side transparent views, respectively, of the fuel injector of the plasma combustor of FIG. 5.
Figure 8B:
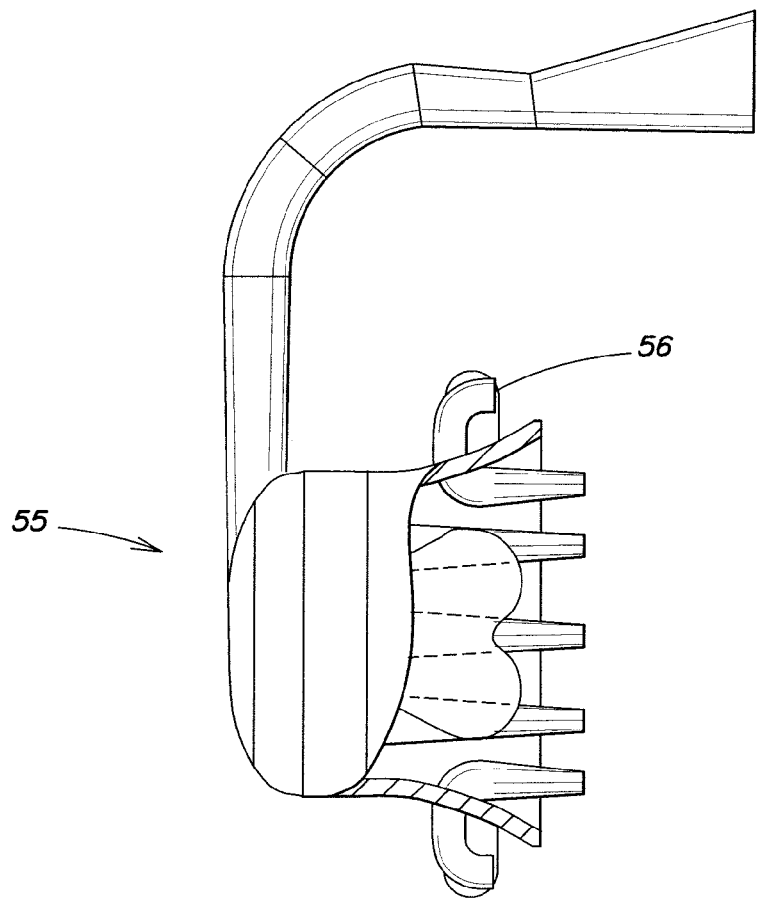
Figure 9B:
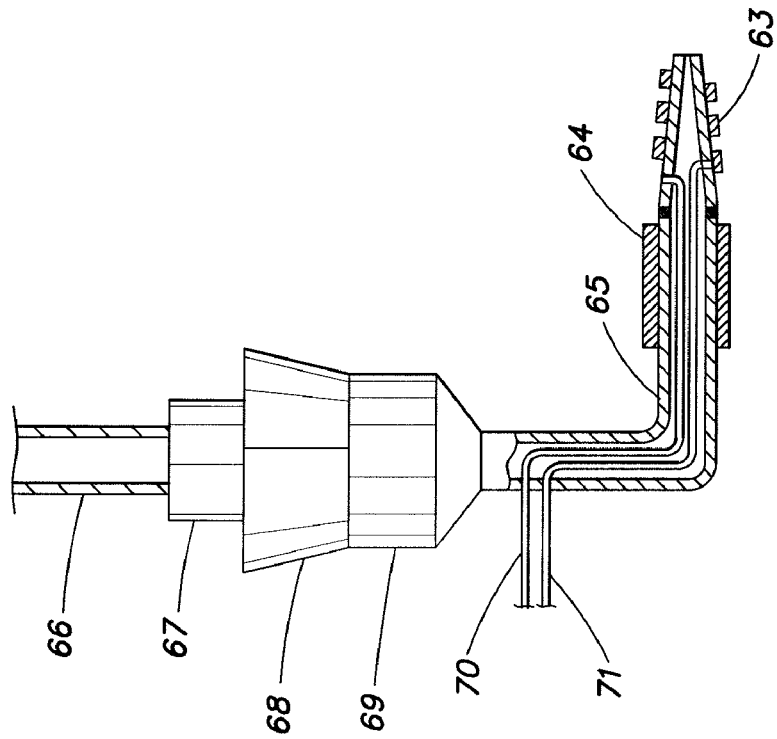
FIGS. 9A-B are conceptual, cross-sectional view of double and single port fuel injectors, respectively, of the plasma combustor of FIG. 5.
Figure 9A:
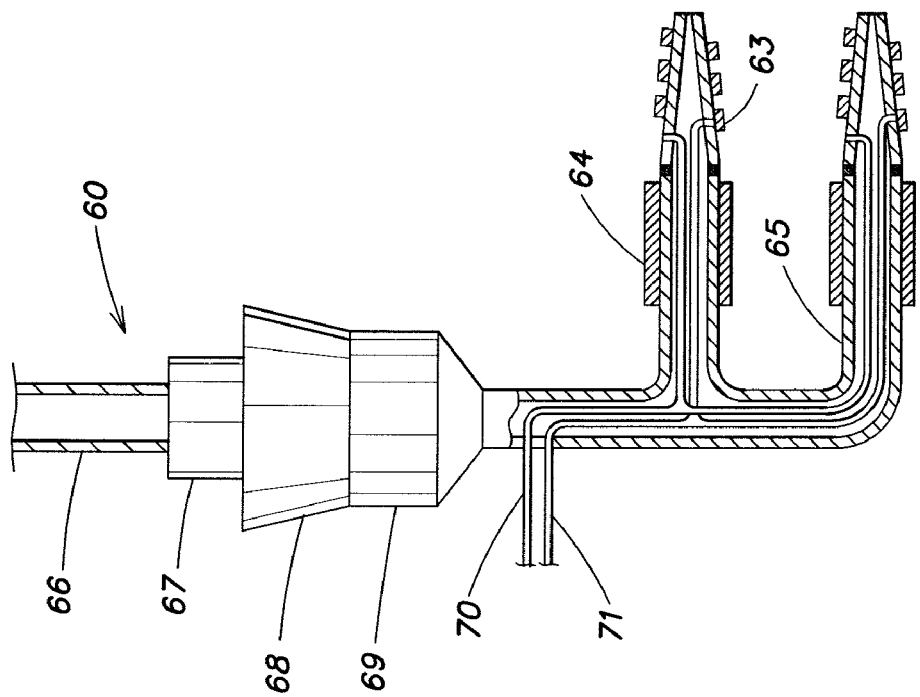

The inner portion of the rows of turbine blade pairs, that portion surrounding the hollow core, as shown in FIG. 5, is designed so that the cross section of the channel through which the air passes in the compressor section is varied from front to rear so as to achieve an optimum thrust vector component of the exhaust air from the ion plasma combustor against the turbine pair blade rows, which rotate at high velocity and generating high density electric current from the superconducting generation coils. While rotating, the design and arrangement of the turbine rotor blades, from stage to stage accelerates the velocity of, and contributes to the endothermodynamic action of, existing exhaust gases out of the nozzle.

The turbine blade pairs are magnetically levitated by pairs of permanent magnets (48) in the distal (inner ring end) portion of the rotating turbine ring assembly, e.g. the inner ring assembly with respect to the outer turbine ring and engine casing. A repulsive magnetic field is actively controlled by the passing of electric current from the turbine generator into the magnetically levitating copper coils (49). The power generating turbine has three sets of turbine pairs which are levitated against a grooved ring channel (50) and are positioned geometrically so that both out of plane forces and axial forces as the turbine rotates are tightly controlled. Rotational forces of the power generation turbine produce out of plane loads and in-plane loads. Additionally a system of high speed arrestment pelton wheels is configured in the outer engine casing upon engine shut down to capture the turbine upon ceasing operation.

By varying the speed of each turbine stage row interdependently, the kinetic energy extracted from the combustor exhaust flow and transformed into mechanical energy and hence thrust and electricity may be optimized and operational speed timed perfectly to performance requirements of the engine regardless of the speed, altitude, and density, of the aircraft in which the S-MAGJET engines is located.

In one embodiment of the superconducting power turbine ring generator, the turbine ring stage comprises a series of turbine blade rows (150) within the inclusivity of a series of alternating magnet plasma actuators (151) at or near the leading edge of each turbine blade (152) and induction electrodes (153) in parallel and in close proximity to the plasma actuators (151), at or near the leading edge of the turbine blade airfoils (152). The turbine airfoil blade core comprises a magnetic ferrous material (154) that carries a large magnetic charge effective acting as a rotating magnet when passing the superconducting generation coils (155) on the fixed outer ring of the gas turbine which are aligned with each turbine stage. Since the blades are electrically charged they induce electric current in the induction electrodes, which in turn may sequentially switch on or off via optical electrical sensors (156) the electrical current at the stations where the plasma actuators are located along the leading edge. In this manner, electrical current may create in specific regions of the turbine blade airfoils, an ability to geometrically morph, manipulate or control aerodynamic flow, upon the impinging air flow exhaust gases (157) so that aerodynamic drag is removed or reduced, thus turbulence about each individual blade is removed or reduced (158). Drag reduction by this method, electromagnetically, also provides a cooler operating environment, sense, at the molecular level, the exhaust flow coming from the combustor is positive (159), while space the turbine airfoil blade and the plasma actuators and electrodes are negative 160), the molecules are attracted to the surface of the airfoil, hence the surface of the airfoil (161) creates a laminar flow condition. Additionally, dependent of atmospheric and environmental conditions, exhaust flow past the electrically flow controlling turbine blades may so be adjusted so that contaminants in the exhaust stream flowing past the turbine stages may be manipulated to reduce emissions of oxidants ($CO_2$, $NO_2$, $SO_2$). In the illustrative embodiment, the turbine airfoils are staggered in pairs circumferentially around the perimeter of an upper edge outer induction superconducting drive ring (162) and a lower edge rotating inner induction superconducting drive ring (163) with a non-ferromagnetic structural induction bridge component between the two blades. This method of electrifying the power turbine ring generator at the turbine blade with the embedded magnet plasma actuators and induction electrodes provides a method of controlling and generating increased thrust and efficiency levels in the S-MAGJET gas turbine. Additionally, with this configuration, power is generated as the series of turbine stages with the electromagnetic drag reduction turbine blades, static and rotating circumferential ring masses pass one another and electric current is generated.

Magnetohydrodynamic (MHD) Accelerator

Figure 14:
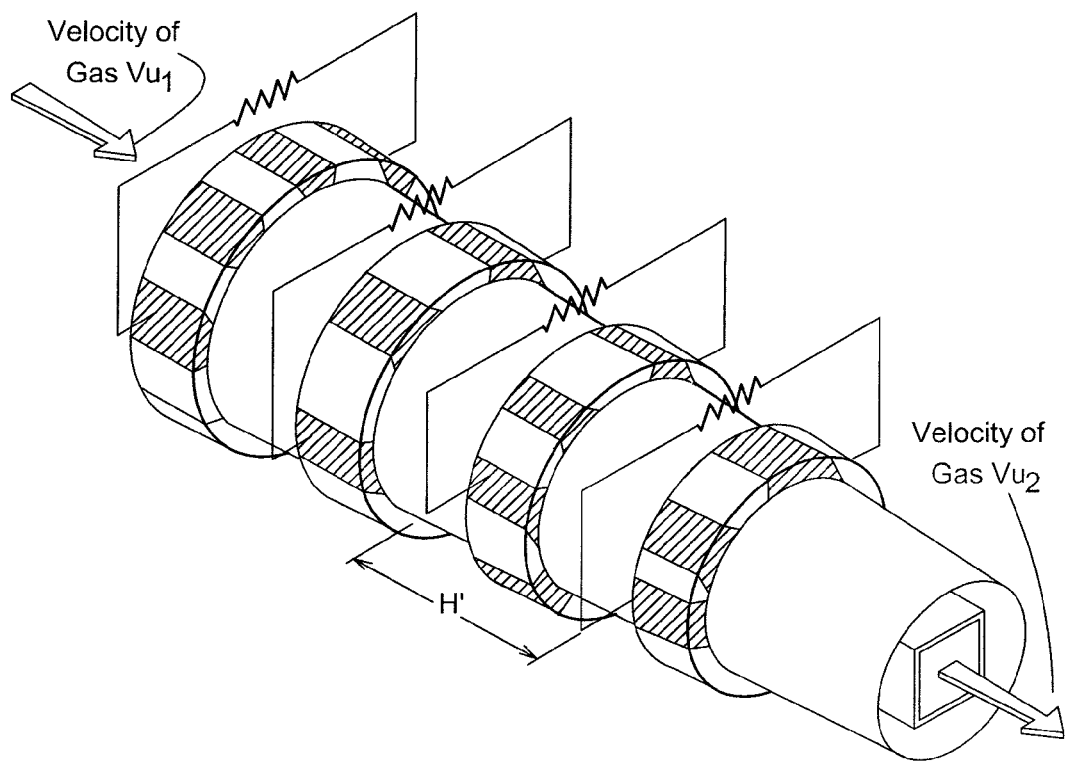
FIG. 14 is a conceptual, perspective view of an electrode gas plasma accelerator in accordance with the disclosure.

The S-MAGJET engine utilizes, as a component of the nozzle, a magnetohydrodynamic (MHD) accelerator (FIG. 14-15) where electric power from the superconducting ring turbine generator is utilized to create a ionized gas source (110) from the combustor and maintain it as it exists and enters the MHD Accelerator (111). Initially the ion plasma combustor ionizes the exhaust gas through the ion plasma combustor dual-port fuel injector (60), the gas passes through the combustor as a plasma carrying a negative charge and upon existing is attracted to and is accelerated by the first series of ring accelerator induction electrode plate (109). In the system as exhibited in FIG. 15, V is the voltage load across the accelerator. B is the magnetic field measured in Tesla. The Lorentz Force is the product of B and V, and U being the flow speed or velocity of the accelerated exhaust plasma. Typical current draw to a plasma accelerator is high, however, the disclosed engine utilizes the technique of seeding the plasma electrically before it enters the accelerator induction electrodes to increase the magnitude of the current flow by an order of magnitude. This process of the electromagnetic nozzle design in a segmented supersonic engine and the process of seeding the flow electrically with ring plasma accelerators was previously not possible as the high power source is critical to its successful operation and no on-board high power energy generation source was available unlike in the superconducting ring generator technology available in S-MAGJET.

Design of the S-MAGJET Segmented MHD Accelerator with only the high voltage field available from the superconducting ring turbine power generator is much less complex since the field will ionize the air itself.

Seeding the plasma jet exhaust stream with low ionization energy from an electric source results in a tremendous increase in conductivity relative to the unseeded usual gas. For instance, a supersonic vehicle flying at altitude of 30 km at Mach 3.6 would ionize the air after a bow shock to 1.0 A=ma, a 20-fold increase over a non-seeded or electrified jet exhaust stream. However, he vehicle-scaled power requirement to fan air-breathing engine incorporating thermal ionization and thrust generation by an electromagnetic accelerator as in this topology requires at least 10 MW continuous pulse phase power.

Figure 15:
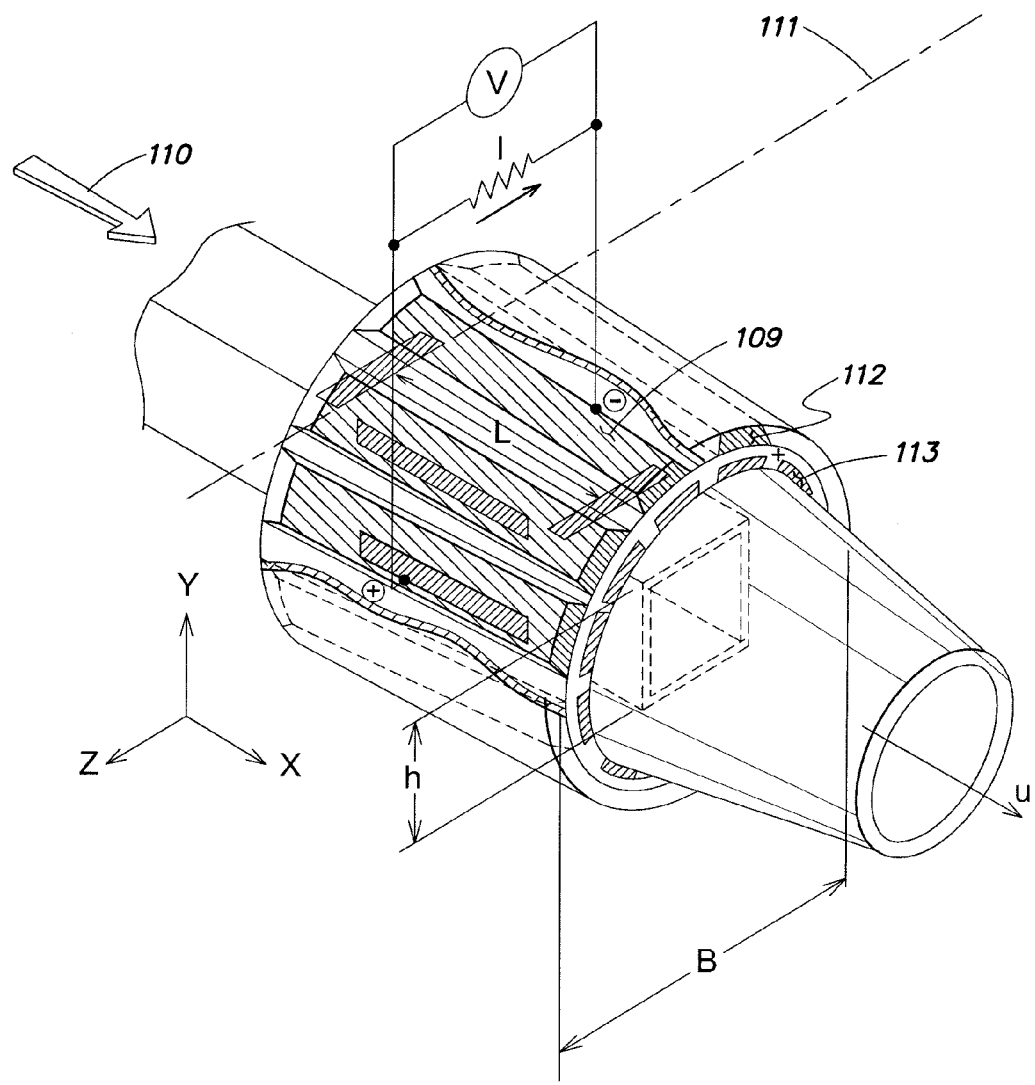
FIG. 15 is a conceptual, partially transparent, perspective view all a single ring accelerator.

Referring to FIG. 15, Generation and Acceleration load equations denote algebraic expressions of the magnetic field as it relates to power to overcome the Hall Effect and to generate the magnetic field load which accelerates a single plasma ion particle from one ring electrode plate to the next. The notation J is the current field in amps/m2, where E exemplifies the electric field in volts/meter, and where conductivity in ohms/meter defines the ability of the electrode series circumferentially to pull a single ionized plasma molecule one linear meter down the MHD accelerator tunnel 1× meter/second against the voltage load, V. In S-MAGJET the MHD accelerator nozzle is approximately 4.5 meters long, with the acceleration load equation, defined algebraically as equation 8A-2. Increases in J are exponential to the spanwise Cartesian coordinate y, as a fraction to x, the streamwise Cartesian coordinate, this as a product of the conductivity O (theta) as it relates to x, divided by the magnetic field B. Therefore it is B which must be maximized to overcome the voltage load and optimize the accelerating load path of the streamwise Cartesian coordinate x, minimizing the Hall effect in the process, while maximizing the Lorentz force, F1 as ionized particles per unit volume, N/m3. B is increased per unit volume as the exhaust stream from the combustor is seeded electrically, therefore increasing Tesla T, which is what is wanted with the high power density electric current from the superconducting ring generator making this possible. It is this combination of electric seed in a multiple ring MHD accelerator using on board high power electric current in a pulse phase array which decrease in volumetric and circumferential size, essentially compressing the flow field, increasing T, thereby providing magnitudes of accelerated particle flow higher than what is achievable in the art.

Seeding of chemical catalysts potassium or cesscium, in place of, or in addition to, seeding with low ionization energy from an electric source, results in increases by approximately 20 fold the current flow where up to 900 A at 80V was passed through the system. S-MAGJET has been sized in the 54,000 lb. thrust class to provide over 14 MW in flight under supersonic operational conditions creating a flow with a conductivity of up to 500 A=m with electrical seeding. Note that units of conductivity are labeled using A=m which is equal to $O\_1$=m. Historically, conductivity has been described using mhos per meter although the unit name Siemens (S) has been designated for $O\_1$ to make A=m equal to S/m.

Control Systems

Contained throughout the engine are systems of sensors and controllers, such as optical and electrical sensors, that measure pressure, velocity, acceleration, temperature and other aspects of air flow, electromagnetism, electric power generation, temperature and the engine operations. Such sensor systems are placed in the various sections of the engine in a manner to provide sufficient information to embedded computer systems on the aircraft to enable the operation of the engine to be optimized to the particular operating conditions to which the engine is subject. Further, controllers of various types are located throughout the sections of the engine to enable the speed of the ring motors and the ring generators to be regulated, ionization of exhaust gases to create plasma, and percentages of active magnetic plates to be on to create increased exhaust velocity flow. An electrical distribution system enables the electrical current from the turbine generators to be distributed to the ring motors of the bypass fans and of the compressor stages, and also to the combustor for ionization for ignition of the fuel and control of the fuel burn.

Figure 16:
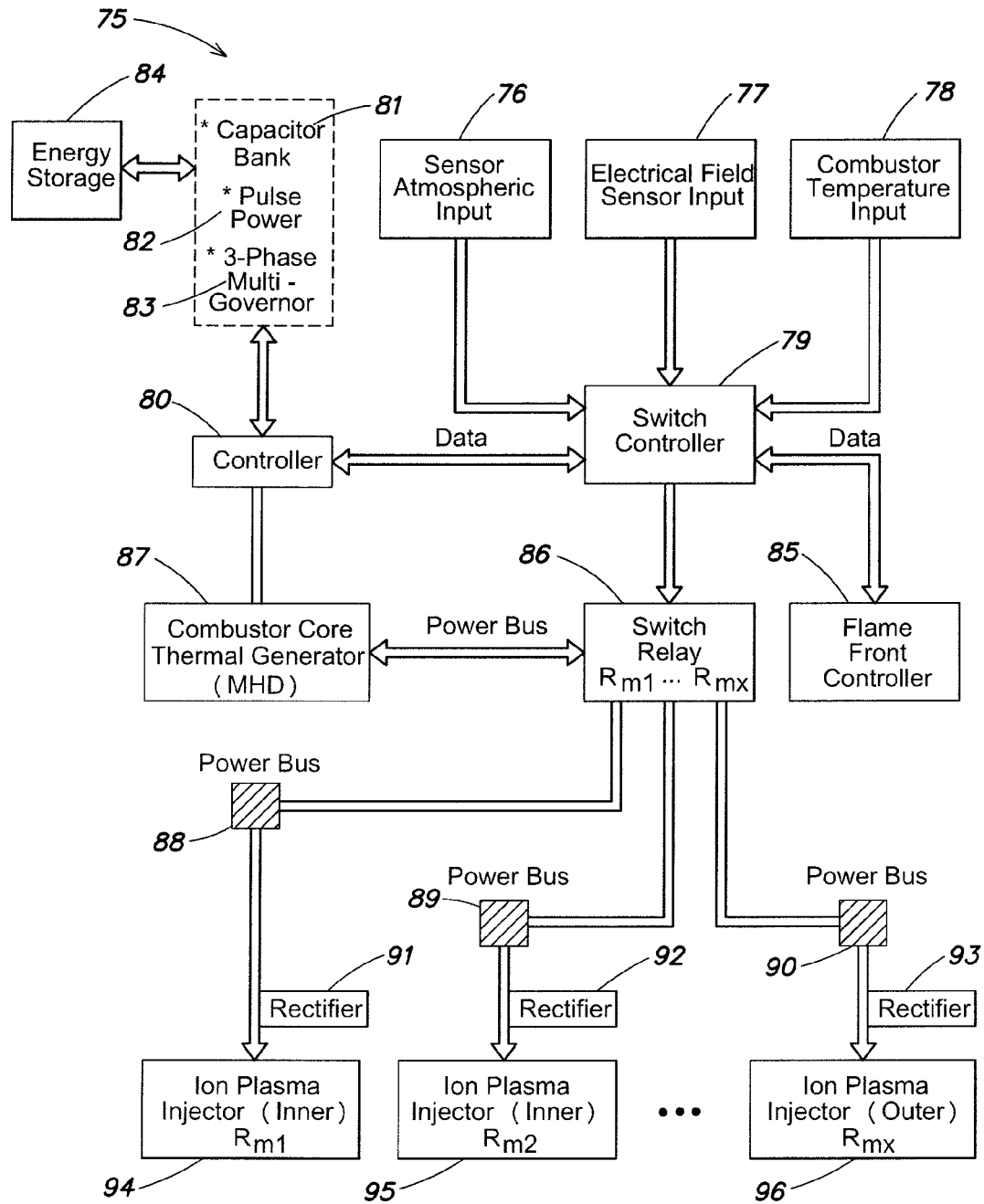
FIG. 16 is a schematic block diagram of an ion plasma control system in accordance with the disclosure.

As illustrated in FIG. 16, the ion plasma combustor (13) is controlled by a series of controllers, sensors, switches, relays, power buses, and rectifiers that sense and generate data for embedded software processors which run the engine, designated the ion plasma combustor power control system (75). The power control system (75) is governed by baseline data from the engine operating environment through sensors which pick up atmospheric input (76), electrical field input (77) and combustor temperature sensor input (78). These sensor elements provide feedback in the loop for the S-MAGJET engine via a switch controller (79), which acts as a clearing house and data bus for switching to appropriate controllers in various aspects of engine 1. A Data controller (80) is part of the power control system processing and controlling three main power controls: capacitor bank (81), pulse phase power (82) and 3-Phase Multi-Governor (83) which is connected to an energy storage system (84) to dump excess electric power generated in the engine but not used. A flame front controller (85) monitors the geometric position, flame intensity and decay rate of the plasma combustion flame front at any given point in time in the ion plasma combustor, as the flame travels from a forward position to a rearward position in the combustor. A switch relay (86) with functional capability to switch in multiple inputs from Rm1-Rmx, wherein n is the number of switching function inputs, which are connected to the combustor core thermal generator processor (87) and the ion plasma fuel combustor (13) segmented magnetohydrodynmaic (MHD) continuous electrode gas plasma generator (8). Switched relay data from the control and process operational elements of the engine are passed to the electrical power management system through power buses (88, 89 and 90), which filter the switched relay signals, and are then inverted by being passed into rectifiers (91, 92 and 93) to the point where the processed signal and electric power is connected to the electromagnetic ion plasma injector(s) (94, 95 and 96).

Figure 17:
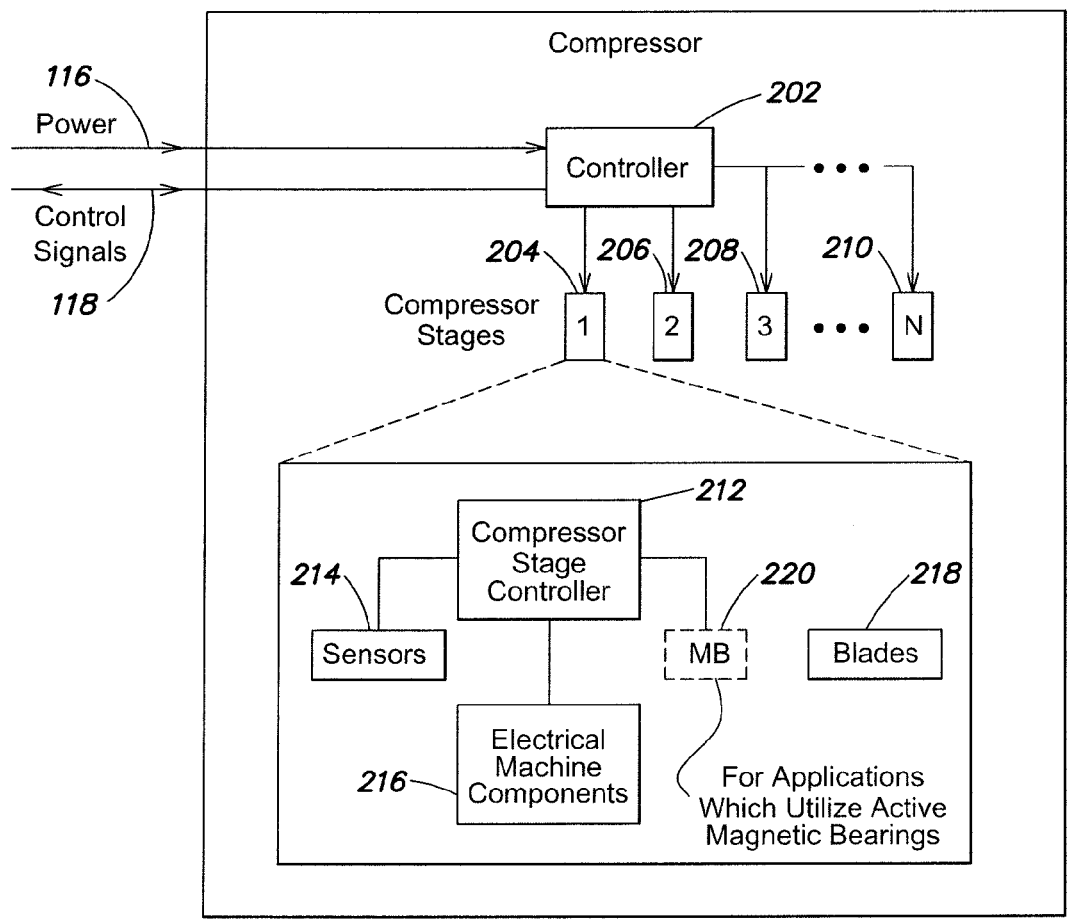
FIG. 17 is a schematic block diagram of an compressor control system in accordance with the disclosure.

The compressor (11) is controlled (FIG. 17) through a controller which takes in processed control signals (118) from the flight deck inputs and electric power (116) from the turbine generator and energy storage devices to operate, and provides control signal inputs to each successive compressor stage from the first stage (204) to the second stage (206) to the third stage (208) and up to the Nth stage (210). In the illustrated embodiment, since the S-MAGJET has eight stages, eight compressor stage controllers are utilized. Each compressor stage of the controller (204), for example, has an embedded processing unit, referred to as compressor stage controller (212), in communication with a series of sensors (214) and electrical machine components such as permanent magnets (216), applications which utilize active magnetic bearings (220), and sensor controller for compressor blade positioning and speed (218).

Figure 18:
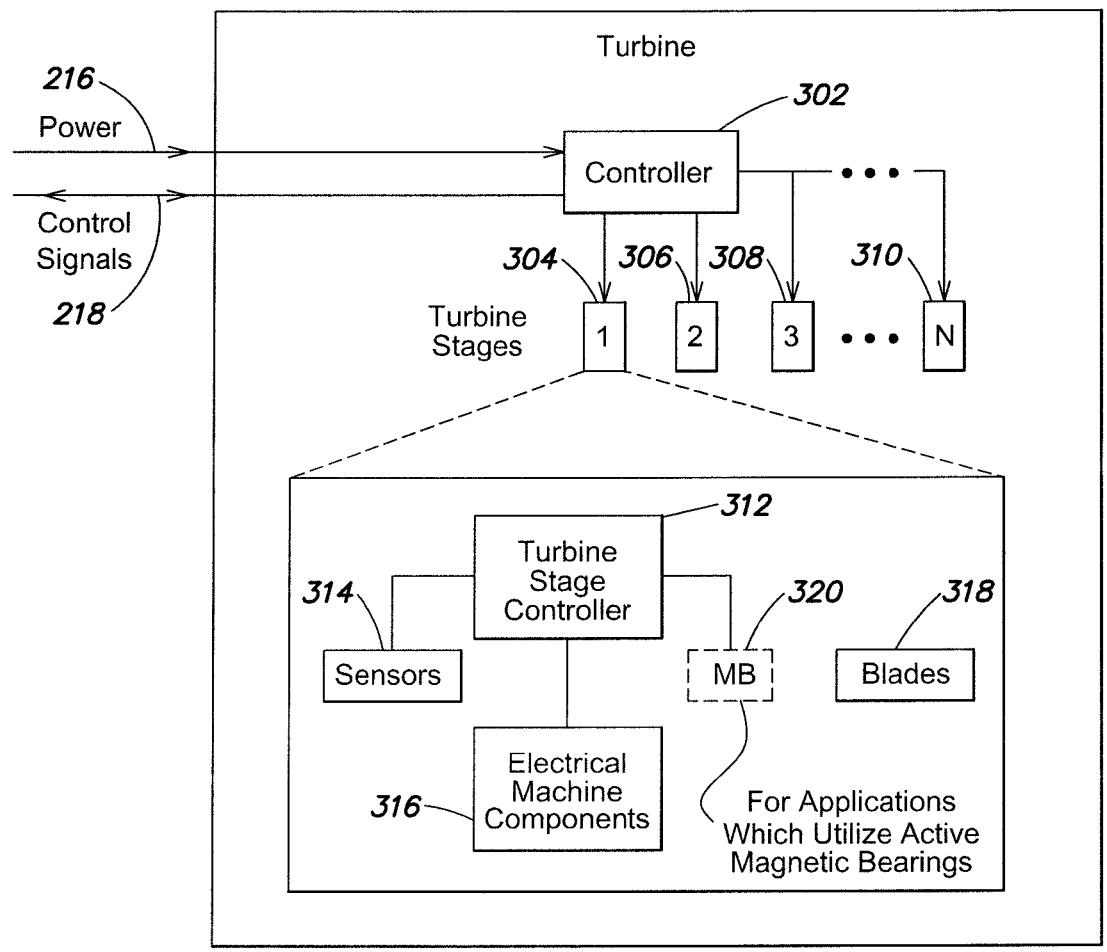
FIG. 18 is a schematic block diagram of an turbine control system in accordance with the disclosure.

Similarly, power turbine (14) is controlled (FIG. 18) through a controller which takes in processed control signals (218) from the flight deck inputs and electric power (216) from the turbine generator and energy storage devices to operate, and provides control signal inputs to each successive turbine stage from the first stage (304) to the second stage (306) to the third stage (308) and up to the Nth stage (310). In the illustrated embodiment, since the S-MAGJET has six stages, six turbine stage controllers are utilized. Each turbine stage controller (304), for example, has an embedded processing unit, referred to as turbine stage controller 312 in communication with a series of sensors (314) and electrical machine components such as permanent magnets (316), applications which utilize active magnetic bearings (320), and sensor controller for compressor blade positioning and speed (218).

Figure 19:
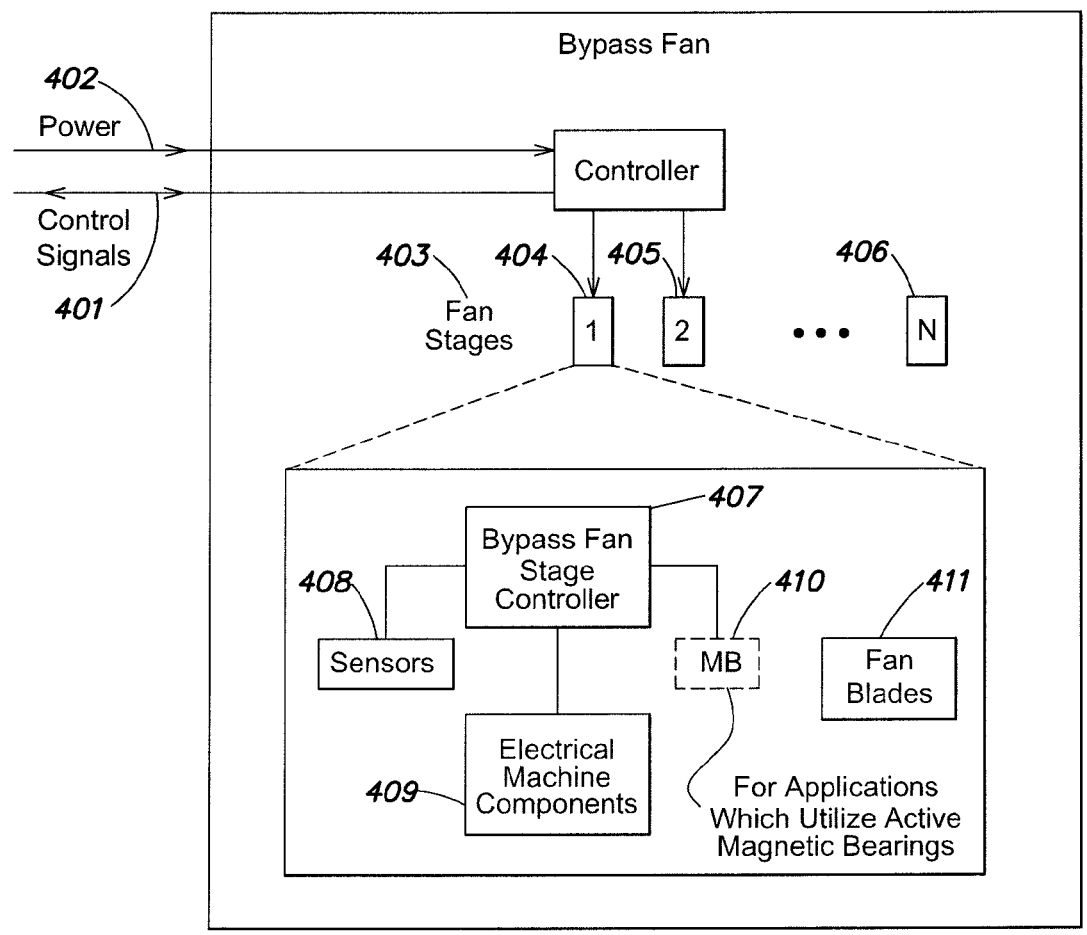
FIG. 19 is a schematic block diagram of an bypass fan system in accordance with the disclosure.

The bypass fan 4 is controlled (FIG. 19) through a controller which takes in processed control signals (401) from the flight deck inputs and electric power (402) from the turbine generator and energy storage devices to operate, and provides control signal inputs (403) to each dual counter rotating bypass fan stage, from the first stage (404) to the second stage (405), up to any number of Nth stages (406). In the illustrated embodiment, since the S-MAGJET has two counter rotating, superconducting ring motor bypass fans, so two bypass fan stage controllers would be needed, each bypass fan stage has an embedded processing unit termed a bypass fan stage controller (407), and spun off from that are a series of sensors (408), and electrical machine components such as permanent magnets (409), and applications which utilize active magnetic bearings (410), and sensor controller for compressor blade positioning and speed (411).

Electrical Brayton Cycle

Figure 20:
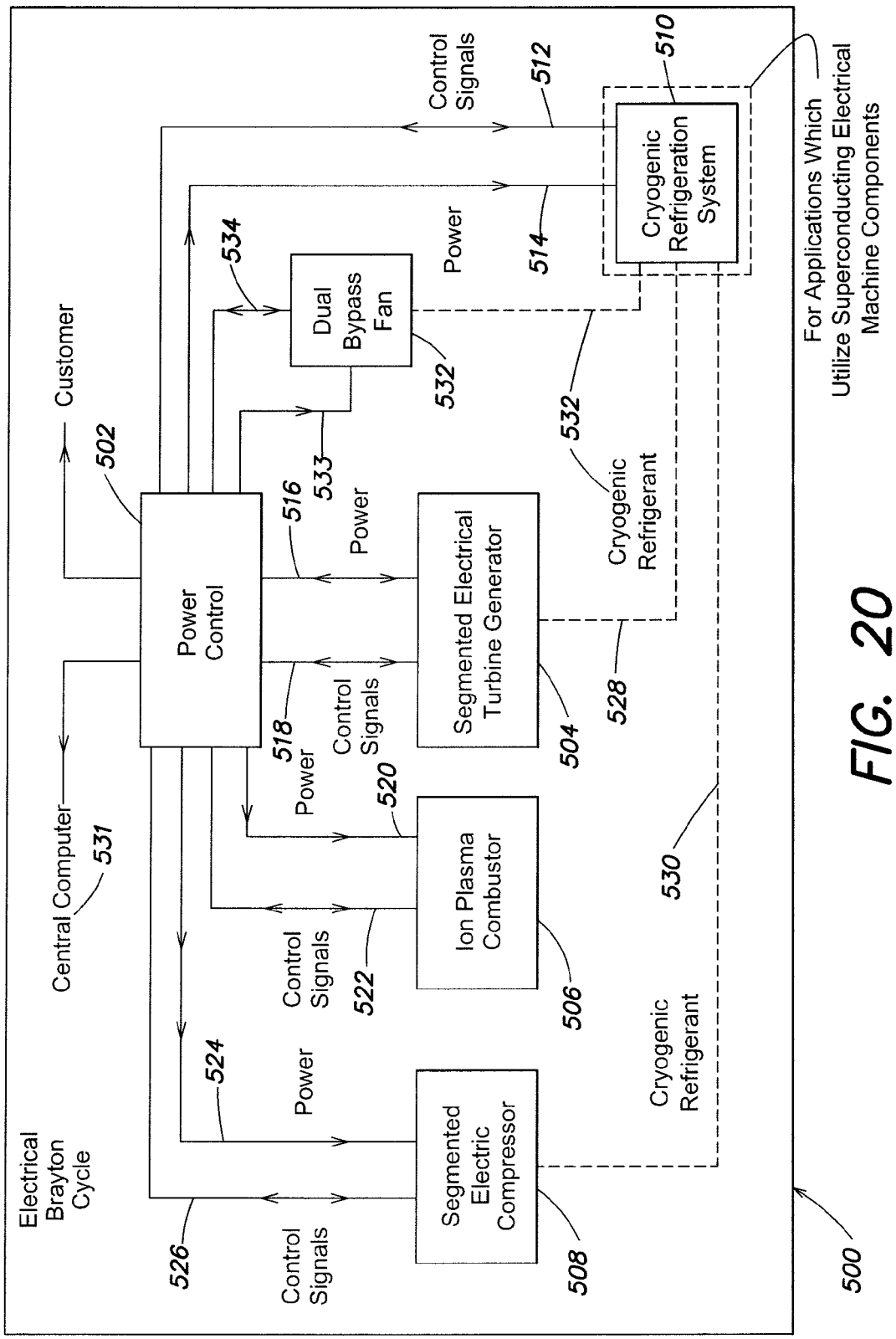
FIG. 20 is a schematic block diagram of an electrical Brayton cycle control system accordance with the disclosure.

The topology and electromagnetic architecture of S-MAGJET provides an operational gas turbine Electrical Brayton Cycle (FIG. 20) which is created from the management and manipulation of the segmented electrical architecture of the engine and the ability to independently control the tangential velocities of airflow in the compressor, and hence compression, delay or advance as it relates to thermodynamic expansion and combustion in the power turbine, and advance or delay the combustion process by controlling the position, density, and magnitude of the flame front in the ion plasma combustor. As illustrated in FIG. 20, the Electrical Brayton Cycle is controlled by a power control system (502) which provides control signals from a central computer (531) to the segmented electrical compressor (508), the ion plasma combustor (506), segmented electrical turbine generator (504) and segmented dual counter rotating bypass fan (532). A cryogenic refrigeration system (510) provides liquid nitrogen coolant to the superconducting induction motors of the segmented bypass fan and compressor, and to the electromagnetic AC switched reluctance power generator coils in the segmented turbine. Power is provided to each one of these turbomachinery systems as denoted by the segmented electric compressor (508) receiving power (524) from the power controller; the ion plasma combustor (506) receiving power (520) from the power controller (502); the segmented electrical turbine generator (504) receiving power (516) from the power controller (502) and the dual bypass fan (532) receiving power (533) from the power controller. Signal processing is also provided by the power controller to these same turbomachinery systems as denoted by the control signals (526) for the segmented electric compressor (508); control signals (522) for the ion plasma combustor (506); control signals (518) for the segmented electrical turbine generator (504); and the control signals (534) for the dual bypass fan (532). Electrical power (514) for cryogenic cooling maintenance of the liquid nitrogen is provided from the power controller (502) to the cryogenic refrigeration system (510) and control signals are passed into and out of the power controller through an insulated processing trunk line (512) to carry those signals.

The Brayton Cycle is used for gas turbines where both compression and expansion processes take place in rotating machinery. The Electrical Brayton Cycle is formed by the electromagnetic segmentation of the S-MAGJET engine and is a departure from the more typically known in the art Brayton Cycle, that is considered the only engine cycle for gas turbine engines, both this is for thermal turbomachinery that have stage limiting drive shafts and exhibit only thermal efficiencies of roughly 35%.

Brayton Cycle components usually operate on an open cycle; fresh air at ambient conditions is drawn into the compressor, where its temperature and pressure are raised. The high-pressure air proceeds into the combustion chamber, where the fuel is burned at constant pressure. The resulting high-temperature gases then enter the turbine, where they expand to the atmospheric pressure through a row of nozzle vanes. This expansion causes the turbine blades to spin. Exhaust gases leaving the turbine in the open cycle are not re-circulated. The ideal cycle that the working fluid undergoes in this closed loop is the Brayton cycle, which is made up of four internally reversible processes: 1) Isentropic compression (in a compressor); 2) Constant pressure heat addition; 3) Isentropic expansion (in a turbine); 4) Constant pressure heat rejection.

Efficient compression of large volumes of air is essential for a successful gas turbine engine. The object of a good compressor design is to obtain the most air through a given diameter compressor with a minimum number of stages while retaining relatively high efficiencies and aerodynamic stability over the operating range. Compressors typically contain a row of rotating blades followed by a row of stationary (stator) blades. The invention of S-MAGJET does not contain stators, as rotating rows of compressor stages remove the need to use stators and the kinetic energy is transferred via timing sequences of rotation and speed from stage to stage, work is more effectively transferred by the precise electromagnetic velocity and rotational speed of each compressor. Aerodynamic drag and swirl is removed as there is no disturbance at the rotor. All work done on the working fluid is done by the rotating rows, each counter rotating stage to the previous one converts the fluid kinetic energy to pressure immediately without straightening of flow at a stator, and counter rotates the direction of the fluid to the next rotor stage reducing kinetic losses less than compressors with stator stages.

Figure 21:
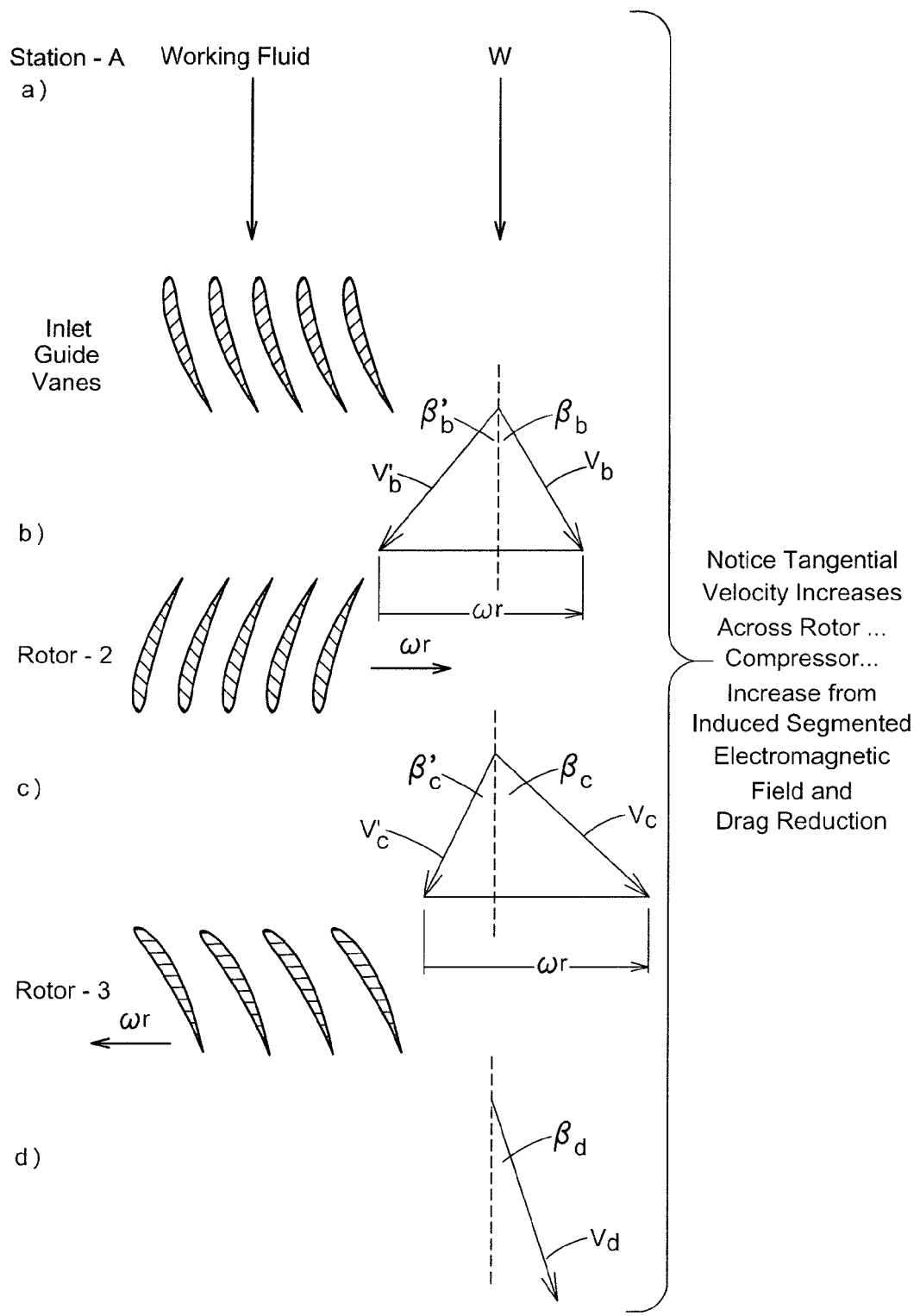
FIGS. 21-22 are conceptual diagrams of vain blades placements in accordance with the disclosure.

The conceptual illustrations of FIG. 21 demonstrate the increase in tangential velocity where Vd increases linearly in respect to Bd at a greater magnitude than in a compressor with stators, as lack of stators allows Vd to increase due to the working radius, Wr of the working fluid increasing, and opposing Wr for the previous counter rotating compressor stage having greater kinetic energy also, due to lack of fluid flow straightening stators, this exhibited Vc and total magnitude Wr.

Figure 22:
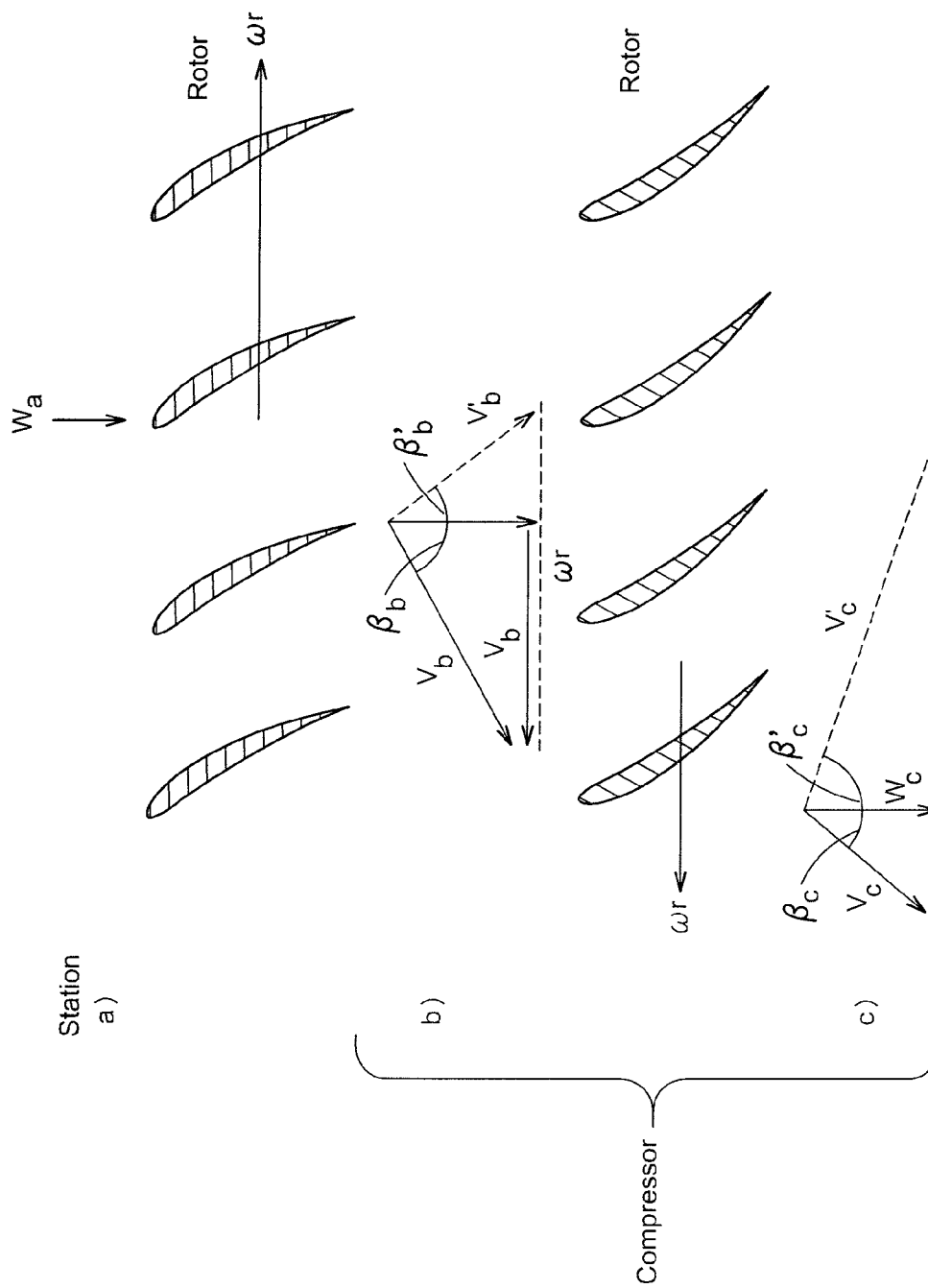

Further examination of the creation of the Electrical Brayton Cycle and how it is sustained through kinetic energy extraction in the electrical compressor is examined in the vector analysis for a paired, counter rotating, two stage compressor blade rows as in FIG. 22. An increase in velocity work flow and extraction of increased kinetic energy due to work done on the fluid is exemplified in the magnitude increase from stage to stage of Vb as compared to V'c. Here the tangential velocity, which is drag, reduces across the rotor as greater work is done stage to stage exhibited in the vector Wr, brought on by the electrics and electromagnetic drag reduction at the ferromagnetic compressor blade; as similarly described in the electromagnetic turbine blade analysis.

Utilizing CMCs, S-MAGJET is designed to operate at the higher more efficient combustion temperatures for Jet-A fuels and biofuels. Additionally, a more complete combustion from the higher compressed air temperatures is achievable, because of the electrically driven and segmented compressor, which affords compression ratios higher than 70:1, more than twice as high as current engine technology.

Alternative Subsonic Implementation

Figure 23:
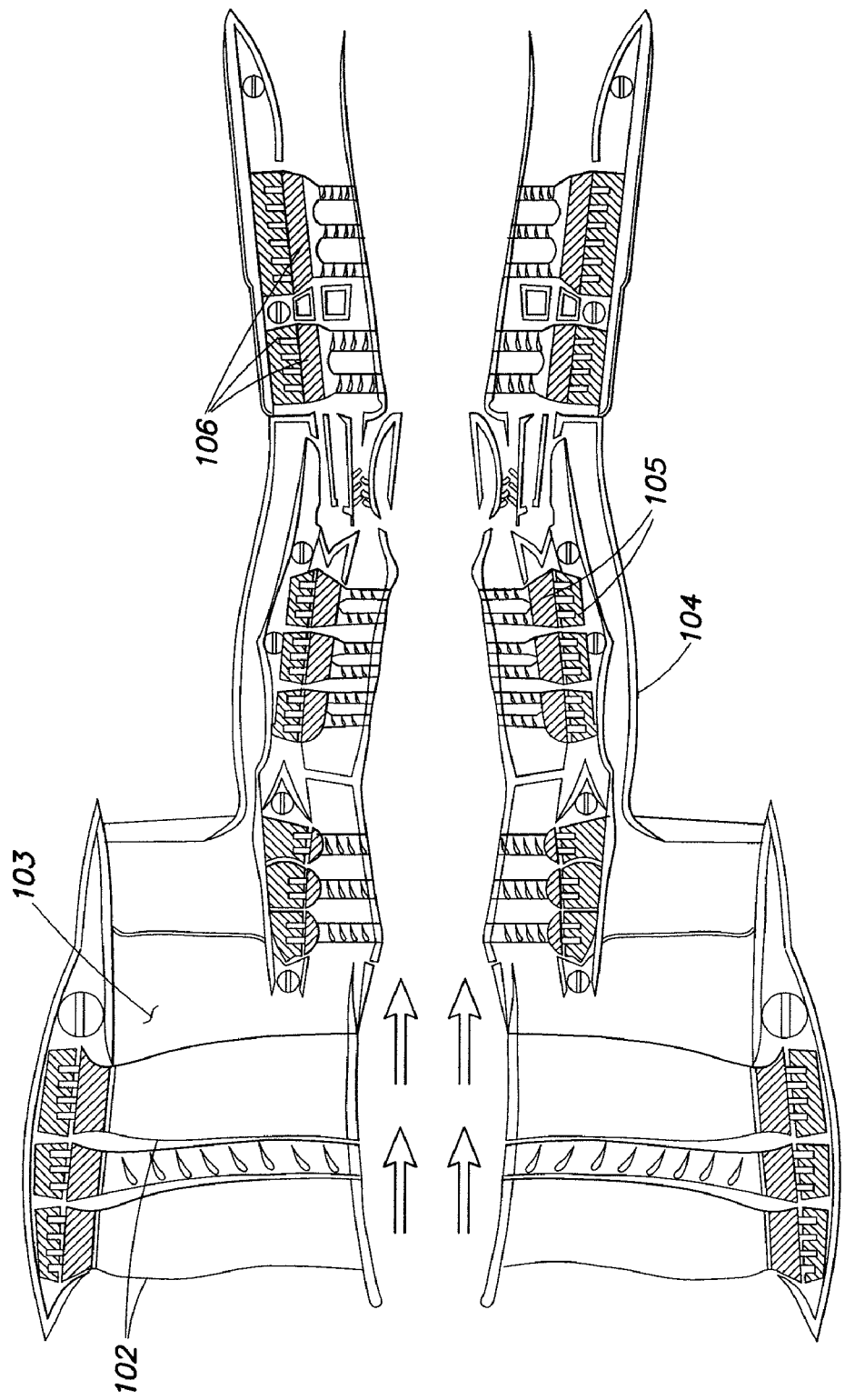
FIG. 23 is a cutaway, cross-sectional view of an alternative embodiment in accordance with the disclosure.

An alternative embodiment of the S-MAGJET embodiments described herein, is referred to as the MAGJET. As illustrated in FIG. 23, MAGJET has a similar structure and many of the same components as the S-MAGJET embodiments and is a suitable engine design for use in subsonic conditions (below Mach 1.0 or 760 MPH at sea-level). Absent from the MAGJET embodiment are the features of an aero spike for controlling shockwaves and mass flow spillage, as described with reference to the inlet section of the supersonic embodiment. Also, the dual counter-rotating bypass fan sections are housed in separate, but connected, structures driven by superconducting ring motors (102) without an aerospace and narrowed inlet. In this alternative embodiment, the bypass fan is designed to maximize the mass of air flow at a low velocity, whereas in the supersonic embodiment, the dual bypass fan is significantly smaller in diameter and sized to maximize the velocity of the airflow, with less mass, but more speed. In the subsonic embodiment illustrated in FIG. 23, the diameter of the bypass fan is increased and the bypass fan section is contained in a separate bypass fan duct or shroud (103) that is supported by the gas turbine engine outer engine casing (104) and the hollow shaft structure.

There are numerous other significant features of the subsonic embodiment described herein. For example, the use of the turbine rows of the engine as rotors for electrical generators enables the generation of many megawatts of electrical energy (105). In addition, the use of magnetic air bearings to transfer the weight and rotational forces of the rotating components of the engine, and the availability of electric current in quantities sufficient to power the rotating elements of the bypass fan and the compressor, eliminates the need for a turbine shaft (106). Further, bypass air may be channeled down the center of the engine through an inner tunnel bypass air duct and may so be diverted through gates or ducts, so as to provide inner internal cooling to the turbine power generation system and simultaneously feed bypass air directly into the combustor for cooling. Such air is not compressed by the compressor, but is compressed by a ram air effect via the velocity of the air flow from the speed of the engine traveling through the atmosphere when attached to an aircraft (107).

In an alternative embodiment to those described herein, the superconducting ring motors which drive the bypass fans and the compressor stages take electric power from the superconducting ring turbine generators. In this embodiment, the motors are induction electric machines and permanent magnets are not used. In such embodiment, the electric field is induced by an electric current passed into the stationary armature located about the engine casing which induces an electromagnetic charge and a field flux into the induction coils in the bypass fan and compressor blades.

Engine Segmentation in Theory

S-MAGJET uses a counter-rotating dual axial fan, with a diffuser in between each stage and at the axial fan exit, that includes a rotating blade row having blades that receive a supersonic entry flow in the absolute frame and decelerate the flow to a lower supersonic velocity exit flow, while adding work to the flow to increase stagnation pressure. For supersonic entry flow the electric counter rotating bypass fan and the counter rotating diffuser, slows the flow path to a point of ideal inlet conditions, which is obtained electrically and independently from other rotating components of S-MAGJET, and to ideal atmospheric conditions and mass flow rate, hence less kinetic energy form the flow path needs to be absorbed by the inlet and a lighter structural and more aerodynamically effective supersonic inlet is achieved along with improved laminar flow dynamics to the engine bypass fan face.

The counter rotating diffuser in S-MAGJET reduces airflow swirl and back pressure to the compressor thereby maximizing the diffusion of inlet airflow at the high subsonic Mach number condition (Mach 0.95) before it enters the electrical compressor. In the supersonic diffuser of MAGJET, the supersonic derivative of the engine airflow swirl can be further reduced as inlet air is slowed to a subsonic condition, maximizing diffusion prior to entering a six (6) stage compressor. Conversely in the subsonic derivative of the engine, MAGJET, the engine design has a nine stage electrical compressor. In S-MAGJET, high-subsonic (Mach 0.95) exit guide vanes downstream of the diffuser are used to remove swirl from the subsonic flow before it enters the low pressure and high pressure compressor stages of the superconducting multi-stage axial compressor turbine, and the bypass duct. The counter rotating supersonic diffuser in MAGJET for subsonic flight operations reduces airflow swirl toward the compressor, creating laminar flow upon entrance of the flow into the compressor. This maximizes the performance of the first several stages of the compressor stages 1-4, increasing baseline compression ratio efficiencies and ultimately creating close to 100% compressor efficiency by laminar flow control of air prior to compressed air temperature rise and combustion.

For any constant speed of airflow, specific flow can be increased by electrically reducing the current, and thus RPM, to the rotor, and its subsequent back pressure, which therefore can be decreased until the rotor chokes (back pressure goes to zero), therefore S-MAGJET can have constantly corrected airflow for all flight conditions, and at all bypass fan and corrected air speed and airflow rates.

Within the compressor, S-MAGJET has a higher hub/tip design ratio on the compressor blades, across all the compressor stages. This allows for a larger variation in sweep, mean blade axial length, and blade velocity. Thus, each stage loading can be higher as mass airflow proceeds along the axial length of the compressor. Stage loading can be higher as the tangential velocity is maintained at the proximity of the blade tip, at the integrated electromagnetic trunion, and not at the medial end of the blade where a drive shaft would be located in the prior art. The mechanical force vector is thus higher because of the blades being tip driven with electric power generated by the superconducting ring motors. In this way, tangential velocity may be increased and blade loading increased allowing for increases in sweep, blade area and mean blade axial length. In this way, higher hub/tip design ratios can be engineered in blade design that allows for higher mass flow and therefore higher performance with fewer compressor stages.

Additionally, a twin counter rotating bypass fan may be used to achieve a higher mass air flow at greater loadings, allowing for higher thrust in S-MAGJET than in similar sized prior art supersonic engines. In S-MAGJET 6.5:1 compression per stage compression ratio may be achieved and thus each stage compression ratio may be as high as 12.5:1 to 15.0:1. This higher compression ratio improves mass airflow, air density and increases the airflow temperature allowing for an overall compression ratio of 60:1 to 70:1 over the entire compressor.

S-MAGJET also provides for optimization of flow area, in the 90 percentile range, and the optimized dimensions of the flow path from one electrical compressor stage to the next is achieved as the compressor blades are an integrated structural and aerodynamic component of the outer ring trunion where the superconducting induction coils are located, and that allow for the magnetic levitation in combination with the Halbach Arrays, housed in close proximity and tangentially to the induction coil superconducting electromagnets. This allows for the removal of eddy currents from the air flow and for the removal of aerodynamic non-laminar anomalies. These introduce significant drag induction to the optimization of the flow path. Additionally, the integrated structures of S-MAGJET, i.e., the blending of the blade tips to the inner walls of the inside superconducting induction coil inner ring motor save weight as out-of-plane loads are reduced by the exo-skeleton architecture of the engine. In-plane, and axial loads are carried through to the circular structure of the ring motor trunion, hence compressor blade dimensions and materials can be optimized to the lightest weight for operation and cooling.

In the various compressor stages, blade number and spacing may be reduced and the tip chords and root cords of compressor blades are increased thereby increasing mass air flow loads at reduced RPM. This also allows for increased stage loading, raising compression efficiency, and thus a lower the number of compressor blades that are utilized in each compressor stage are needed, thereby reducing blade count by 15%-20%. This reduces weight, reduces cost, and increases compressor efficiency that also increases fuel temperature burn and fuel efficiency in operation at all flight conditions. Additionally, lower blade counts improve blade cooling as flow path dynamics and entropy is reduced due to higher mass flow rates per blade in any rotating compressor stage.

In the compressor stages, chord to height ratios, C/H, can be increased due to higher stage loading conditions. This is possible because of the rim driven electrical drives on the bypass fan(s) and the compressor/diffuser stages, where each compressor and rotor counts as a compressor stage. The mechanical load capacity of a rim driven electrical machine is higher than a traditional drive shaft machine, as are the size and direction of the tangential velocity vectors at the trunion blade tips of each stage. In S-MAGJET, force vectors are larger in magnitude and direction, thus tangent velocities are greater, at the bypass fan and compressor blade chord height ratios, therefore a higher loading per fan blade can be sustained per stage.

The counter rotating bypass fans and rotating diffuser and rotating compressor stages in the S-MAGJET design are driven independently, thus creating a different loading coefficient from the first bypass fan stage to the second bypass fan stage, and from the first compressor stage to the second compressor stage. This allows for the mass flow loading differentials to be maximized to each velocity vector of each fan and compressor stage. This then allows the diffusion factors for each fan and compressor stage to be adjusted electrically by varying the RPM and the loading factor on the fan blades and compressor blades. This allows for the axial length velocity to be maximized for each stage and blade Mach number to be raised, driving overall engine efficiency and fuel burn rate reductions to efficiencies above 100% over current engine art.

The independently driven stages also allow for additional compression of the fluid flow direction between the rotor and the diffuser and for the blade airfoil camber line. The airfoil profile is therefore distributed differently from the current art across the camberline to reduce drag losses and raise stage coefficient efficiency. S-MAGJET allows for the airfoil profile of the compressor blades to have more wash-out, i.e., a higher pitch as compared to chord length and ratio of chord to thickness is greater all contributing to lower drag—greater chord compared to thickness, and less thickness at the mean aerodynamic chord. In general, the greater thickness of the airfoil is distributed more forward as it relates to the camberline of the blade. This increases lift and decreases drag for each airfoil, and increases the compressor ratio per stage. This allows for greater thrust to weight ratios and lower overall end-to-end drag coefficients, along with increased overall engine performance and efficiency.

The increase of C/H ratio reduces the required number of fan blades in the counter rotating bypass fan of S-MAGJET and the number of compressor blades in the compressor sections that are needed to achieve higher levels of compression than the current art. This allows for increasing adiabatic efficiencies and reducing entropy of the thermodynamic mechanism of the engine. Additionally blade spacings between airfoiled blades can be reduced, thus further reducing the weight of each S-MAGJET compressor stage while maintaining compression coefficient efficiencies at a maximum.

Reduction of the mean radius of the flow radius, which is defined as the average of the tip radius and hub radius of a bypass fan blade, compressor blade, or a turbine blade, can be achieved as well.

S-MAGJET provides for increases in chord/height ratios since there is no center body, i.e., drive shaft, to the bypass fan, the compressor rotor blade stages, or turbine blade stages as they relate to tip and hub radiuses of these components. This is maintained as true in the second embodiment of the invention, the subsonic MAGJET engine technology derivative. The electric drive utilizing superconducting ring motors and ring generators to electrically drive the bypass fan and compressor, allows this open design space to radically reduce the mean radius and flow radius. This allows the S-MAGJET flow radius geometries to be adjusted so that lower bypass fan speeds are achievable for high thrust efficiency on fan blades, such that the bypass fan speeds can be slowed dramatically compared to compressor speeds (2500 RPM vs. 8000 RPM).

S-MAGJET can have lower bypass fan speeds as the bypass fans are differentiated from the compressor electrically. At a lower fan speed setting of S-MAGJET, the inlet guide vanes to the fan at the front of the engine can be radically differentiated in terms of inlet flow angle, and thus reduce the drag of the mass air flow as it impinges on the bypass fan blade, and subsequent impingement on the first several stages of the compressor. The higher the chord to height ratios can be increased, the slower speed requirements of the fan, and hence increases in efficiency.

As discussed above, S-MAGJET reduces the need for the number of stages to achieve the same compression ratios required for combustion. In MAGJET, the number of compressor stages is reduced by 1) inlet flow angle to compressor stages reduced, 2) tip radius and hub radius of compressor blades is reduced by increasing compressor efficiency and reducing drag, 3) chord to height ratios can be reduced on the compressor rotating stages, therefore compressor blades may be closer together, increasing pressure ratio per stage, thus higher compression ratios may be achieved down the length of the axial compressor with fewer stages, 4) The airfoil profile is distributed differently, from current art, across the camberline to reduce drag losses, and thus raising compressor stage coefficient efficiency. As in the case of the S-MAGJET technology the airfoil profile of the compressor blades have more wash-out (higher pitch as compared to chord length and ratio of chord to thickness is greater all contributing to lower drag—greater chord compared to thickness) and less thickness at mean aerodynamic chord, with greater thickness distributed more forward as it relates to the camberline. This increases lift and decreases drag, subsequently increasing compressor ratio per stage with these blade designs, 5) the rotating compressor stages in the hybrid turbomachinary MAGJET are driven electrically, and all independently, thus creating a different loading coefficient from the first compressor stage to the second compressor stage, thus the mass flow loading differentials can be maximized to each velocity vector of each compressor stage, consequently diffusion factors for each compressor stage are adjusted electrically (variation of the RPM and therefore the loading factor on the compressor blades), thus the axial length velocity can be maximized for each stage and blade Mach number optimized to dramatically raise compression design points and overall compression ratio, 6) better optimization of flow area (in the 90 percentile range) and associated dimensions of the flow path from one compressor stage to the next is achieved as the compressor blades are an integrated structural and aerodynamic component of the outer ring trunion where the permanent magnets are housed.

The lower number of stages required to achieve a desired compression ratio allows for a compressor design to effect mean-line diffusion factors—D, and mean-line solidity—A, and polytropic efficiency—E, thus effecting the overall efficiency of the superconducting electrically rim-driven axial compressor machine as a compounding medium and consequently the overall compressor ratio across the machine. Higher compression ratios (above 35:1) offer greater efficient fuel burn, reduced power and drag losses and greater overall thrust in the S-MAGJET turbomachine. The ideal is to raise polytropic efficiency above 97%, of which state-of-the-art designs do not exceed (typically for high performance military low-bypass turbofans efficiency is at 86-88%).

In S-MAGJET, because each rotor stage can be independently controlled, the rotor stages can operate at different Mach numbers, where for each state the Mach number can be maintained, or increased, hub/tip ratio reduced, axial Mach number increased, and the total change in temperature across each stage, instead of being constant, can be raised having a positive effect on the atomization of the fuel as the compressed air (and thus heated air) enters the combustor.

Inlet guide vanes are designed to add swirl in the direction of rotor motion to lower the Mach number of the flow relative to the rotor blades. S-MAGJET allows for the first rotor stage velocity at the compressor, and angular vector to be adjusted to match more closely the inlet Mach number, hence energy conservation is raised as the mass flow moves to the second compressor stage, the third stage and so on. The second rotor stage can be set at the optimum velocity to match the falling Mach number due to swirl and the velocity vector of the preceding rotor stage in the electric compressor. This allows for the electric compressor energy to be conserved so that the compression ratio can be increased to a higher level per each given unit of energy consumed.

Surge and choke lines that bound the operating range of a gas turbine engines are set to maximize the compressor aerodynamic steady state performance and define the boundary points of operation for the compressor within the S-MAGJET turbomachine. To assure compressor stability during operation, an engine compressor is designed with a given surge margin. Typically large surge margins as a design point for steady performance and operation are employed due to transient conditions that move the compressor operating point (compression ratio, mass air flow, mass and stage loading, temperature rise and turbine/compressor rise ratio) close to the surge line. Large surge margins place the compressor operating line and end points far from the surge line and preclude the operation at the desired peak pressure rise or maximum efficiency region of the compressor and the turbine. Two types of instability can develop in a compressor; surge and stall. Surge is a global asymmetric oscillation of flow through the compressor which can reverse the flow during a portion of the surge cycle. These oscillations can result in engine damage from the unsteady thrust load or the ingestion of combustion gases into the compressor and engine inlet. In severe surge cycle, the reversed flow through the compressor can extinguish combustion, resulting in a "flame-out", or total loss of power.

Rotating stall is a local flow deficit that rotates around the compressor annulus. This flow deficit, or cell, is a region in which the local mass flow is near zero. The invention of an electric turbine using superconducting rim-driven compressors and bypass fans as in S-MAGJET described here-in may be so adjusted so as to remove the flow-deficit, maintaining local mass flow velocities above zero, thus reducing the deficit and improving S-MAGJET engine steady performance above current state of the art supersonic and subsonic mechanically drive shafted turbines. Rotating stall may consist of one or more multiple cells that rotate around the compressor at an angular speed which is a fraction of the rotor speed. This instability results in a loss of compressor performance that may require the shut down of the engine to clear. Operating a compressor in rotating stall can contribute to fatigue damage of the blading resulting from the rotating stall unsteady aerodynamic loading. Also the loss in compressor performance during rotating stall can move the compressor to the operating point where surge is initiated by the operating point crossing the surge line.

In S-MAGJET variable speed compressor stages may operate at different speeds and therefore adjust the velocity of flow, angular velocity, mach number flow, and angular vector and shock, pressure ratio, and compression efficiency, so that the surge margin, or compressor stall point may not only be reduced, but that it can be controlled, and consequently operation at peak pressure rise may be maintained and the surge point moved closer to the maximum compressor efficiency operating point without crossing it into stall or surge conditions.

In S-MAGJET, each superconducting rim driven ring motor compressor stage has an optimized RPM and velocity of flow Mach number set from the preceding stage to the next. The design point of the electric compressor is set to maintain the velocity and the pressure of the exit flow from each stator (fixed vane) of a rotor stage to the subsequent rotor stage, rotating at a different RPM, but set to the optimization pressure, temperature and Mach number of the flow to maximize pressure rise between the stages. This optimization is accomplished by actually lowering the flow rate a small percent between the stages. The "stage efficiency" of an adiabatic multistage compressor is defined as the ratio of the ideal work per unit mass of flow to the actual work per unit mass flow between the same total pressures. The other measure of efficiency which is beneficial in the preliminary design of compressors is the polytropic efficiency. The polytropic efficiency of an adiabatic compressor is defined as the ratio of the ideal work per unit mass to the actual work per unit mass for a differential pressure change.

In the limit, as pressure ratio approaches on for a given stage, the "stage efficiency" approaches the "polytropic efficiency". In current art micro-flow energy, enthalpy and efficiency management cannot be done through the micro-management of the airflow between one compressor stage (rotor stage) and the next because every component is connected to a shaft. In S-MAGJET, the shaftless design, where each compressor stage, can be run independently and therefore the micro-management of energy, enthalpy (and entropy reduction) and compression efficiency management is possible. In MAGJET, multiple compressor stages are also present and each is run independent electrically to optimize the compressor variables and present maximum performance for enthalpy, efficiency and micro-flow energy management.

In S-MAGJET, every compressor stator rotor, i.e., the rotor is rotating, and driven electrically where compressor blades driven by the superconducting rim-driven (ring motors) machines compress the air from one compressor stator stage to the next, is a slower moving airfoil blade row, thus having the capacity to add net energy to the flow, as well as acting as a conversion device to the flow, adding some kinetic energy to the flow and raising the static pressure simultaneously of the flow. This thermodynamic enthalpy reaction can change the Brayton Cycle, which is the engine cycle of all current turbine art. Kinetic energy added to the flow provides an enthalpy reaction, raising heat addition and pressure to the second stage Phase of the Brayton Cycle, therefore there is potential for S-MAGJET to generate a wholly new defined "electric turbine" engine cycle which would be novel and unique as compared to current art.

Because each compressor rotor may be driven independently and at different speeds, the engine may be used more efficiently at different stages of the flight envelope. The electrical control of the bypass fan(s) and the compressor affords sensors in the blades of the bypass fan and compressor to detect changes in atmospheric pressure (hence altitude) and adjust all of the different speeds of the bypass fan(s) and compressor stages to optimize compression, thus combustion for that given altitude, consequently there is no lapse in power as operational altitude is raised due to lower air density and the ability to compress air, in effect there is no off-design condition.

Another advantage of the electrically driven compressor is that rotational speed of the rotor stages does not suffer from spool up or spool down time (the time spent increasing or decreasing the rotational speed of the drive shaft) as is the case of current art in turbine designs. The speed of the compressor rotors can be more quickly adjusted due to the electric rim driven high tangential loads (superconducting ring motors), and hence higher velocity force vectors, to achieve optimum performance of the engine based on different flight conditions, airframe loads, and optimal combustion performance can be achieved.

Additionally, with the drive shaft removed in the compressor section, fan section and power turbine section, a "donut hole", and that runs through the center of the combustor, appears in the center of the bypass fan, compressor rotors and power turbine blisks, rotating components (rotor and stator) and generating electrical power in the power turbine utilizing the superconducting ring generators integrated into the outer engine casing of MAGJET. Thus the bypass fan, compressor and power turbine of the engine are protected against "cyclic fatigue" which comes from the production of load paths resulting from the acceleration and deceleration of rotating machinery attached to drive shafts as is the case in the current art. S-MAGJET suffers to a lesser degree from these load path buildups, and has significantly less cyclic fatigue of the rotating turbomachinary components, as well as all of the engine functions in out-of-plane compression loading.

In addition, S-MAGJET, provides thrust as by-pass air around the combustor but also acts as a supercharger to the turbine. To achieve a supercharging effect on the turbine, mass air-flow is accelerated exponentially, in relation to the velocity of the air in question, at any given rate of change in time. The supercharging effect upon the turbine is due to the very high optimal pressures now achievable by the superconducting, multistage axial compressor, which can be tuned to the flight condition and altitude for which the electric compressor fan is designed.

S-MAGJET also provides a further advantage in that rotational speed of the rotor stages does not suffer from spool up or spool down time (the time spent increasing or decreasing the rotational speed of the drive shaft) as is the case in traditional turbine designs, and the speed of the compressor rotors can be more quickly adjusted to achieve optimum performance of the engine based on different flight conditions, airframe loads, and optimal combustion performance.

Because there is no drive shaft, the center "Donut hole" created by lack of a drive shaft offers flow through cooling which is routed to the center of the engine for cooling of the combustor casing thus lowering the "Delta rise" in temperature of combustion gases created from compressed air and atomized fuel.

Losses in compressor airfoils are normally quantified in terms of drop of total pressure divided by the dynamic pressure of incoming flow. This ratio is called the "total pressure loss coefficient", total pressure loss across the compressor airfoils increases with incidence angle and Mach number. Transient flow occurs between compressor rows at the diffuser. The ability in MAGJET to electrically control the RPM, and hence the Mach number of each compressor rotor, of each individual compressor stage, and on either side of the alternating rows of diffusers down the axial length of the compressor can be used to reduce the total pressure loss coefficient.

There are multiple compressor stages in the concept design of the MAGJET hybrid. Electric control of the compressor rotors subsequently affords the ability to adjust the RPM of each compressor stage of the five, and maximize the reduction of pressure drop, and hence pressure loss, as well as reduce the deleterious effects of swirl as seen in current turbine compressor art and related overall turbomachinary. By adjustment of blade Mach number at the compressor tips with each compressor on either side of a diffuser, kinetic energy of the mass flow is maintained, pressure build up is maintained, and the reduction of velocity in the diffusers is kept to a minimum while building pressure ratio increases down the compressor. Both S-MAGJET and the subsonic derivative MAGJET allows for the electrical control input in fractional adjustments through highly sensitive speed and pressure sensors/controllers on the trunions of the rotor and the rotor ring such that the pressure loss coefficient, thus the differential of suction spillage off the compressor airfoils, which correlates to Mach number differential of each compressor rotor stage is minimized. The pressure loss coefficient integrated to the stationary deceleration losses of each diffuser, compressor losses and suction spillage at each compressor airfoil is also minimized from one stage to the next in the axial compressor, and the "total pressure loss coefficient" is reduced, hence raising total efficiency of the electrical compressor in S-MAGJET.

The performance of a gas turbine engine can differ significantly from that predicted independent steady flow models in software design tools. This is because of the inherent unsteady interactions that occur between the various components, i.e. unsteady flow in the form of eddy currents, combustor swirl, etc. The consequences of these dynamics can be quite dramatic, including the unexpected crossing of the compressor surge line while transitioning between engine operating points, i.e. moving from high power take-off thrust settings to design point cruise altitudes and conditions at lower power settings. The unexpected crossing of the compressor surge line in current art of turbine engines during engine transients can result in a complex series of dynamic interactions between the engine components driven by rotating stall and surge. These unsteady operating cycles can be dangerous as they can move to design points in operation of catastrophic failure of rotating high speed turbine components, and in lesser cases substantially reduced performance and durability. These unsteady engine operations near or at surge and stall produce extreme loading for the turbomachinery blading, resulting in high cycle fatigue (HCF) failures. These failures cause the catastrophic failures of engines throwing turbine and compressor blades and completely shutting down in flight. Surge and rotating stall results in dangerous compressed and heated flow induced blade vibrations due to the rapid loading and unloading of the blading. S-MAGJET allows for the electrically driven, stator and rotor electric interdependent/independent design to be sensor monitored and can delay the onset destructive aerodynamic loading which occurs from the operation approaching a surge or stall point. Further, recovery from rotating stall and surge behavior is actually possible and also can be prevented because the surge and stall condition line can be an important issue since it is impossible to guarantee that an engine can avoid such behavior during its operational lifetime.

The application of an external electric field to a flame can affect its propagation speed, stability, and combustion chemistry. External electrodes, arc discharges, and plasma gas injectors have been employed to allow combustible gas mixtures to operate outside their flammability limits by gas heating, injection of free radicals, and field-promoted flame stabilization. The present invention of S-MAGJET utilizes a plasma-generating electrode fuel nozzle, that employs an electric-arc generated from the turbine ring generator(s) of S-MAGJET, behind the combustor at very high voltage and amperage. The fuel nozzle delivers pulsed phased millisecond plasma discharge voltages to the atomized fuel stream prior to combustion, to produce an ionized fuel, whereby the plasma discharge breaks down the long chains of hydrocarbons in the fuel into smaller parts—large fuel molecules are broken into small fuel molecules, creating free radicals and other active species in the gas stream, by which then the fuel is mixed with an oxidizer (air), the overall result is a more efficient fuel burn. The plasma enhancement through the use of the plasma-generating electrode fuel nozzle modifies combustion, flame structure, flame size, and flame power density extending the fuel-lean burn limits and therefore increasing caloric fuel burn efficiency. This ion plasma injection combustor technology consists of an electronic device that can be attached to an existing fuel injector that applies electrical voltage to the atomized fuel stream prior to combustion—generating a plasma in the fuel. This effect essentially breaks down the long chains of hydrocarbons in the fuel into smaller parts—allowing the fuel to be burned more completely, resulting in more miles per gallon, or reducing harmful emissions.

The 54,700 thrust class S-MAGJET engine described herein will allow replacement of all engines for the new regional and luxury business class light supersonic business and transport jets, and the MAGJET 25,000-30,000 lb thrust class will allow the engine described herein to replace current engine technology for the new narrow-body regional jet airliners and medium-to-large size business jets. The 120,000 lb. thrust class engine is of a size where it will retrofit and offer advanced and superior performance to all wide body, long range, subsonic (maximum speed 0.85) airliners compared to current engine technology using mechanical drive systems versus hybrid electric.

Figure 24:
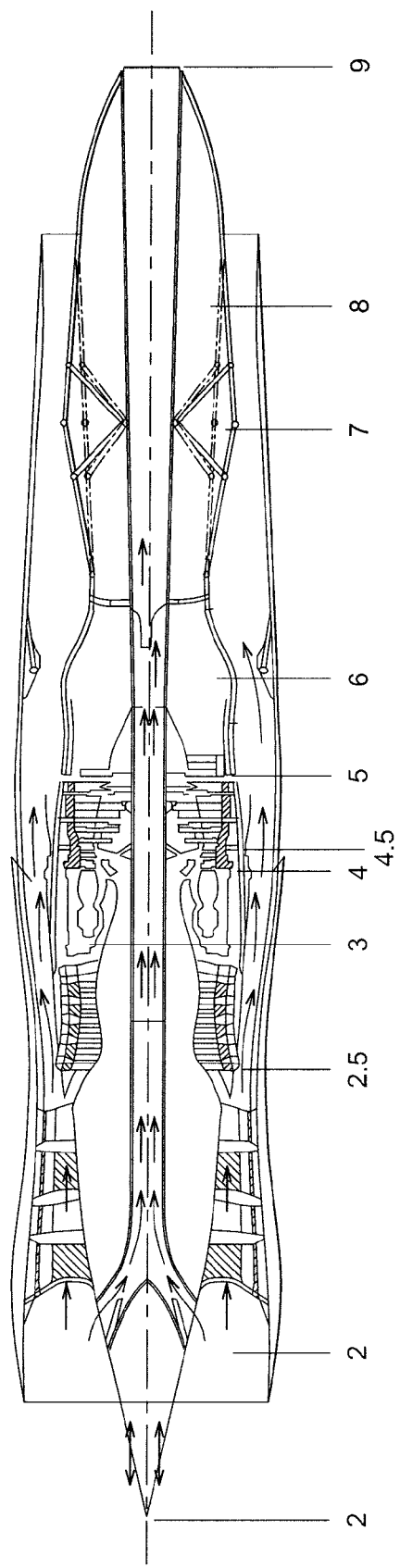
FIG. 24 is a cutaway, cross-sectional view of another alternative embodiment annotated with equation reference numbers which correspond to the equations listed in appendix A.

FIG. 24 illustrates another alternative embodiment of the turbine engine described herein. FIG. 24 is annotated with position indicators which referred to the equations listed in Appendix A which relate to the location within the turbine and air flow pattern most relevant to the calculation.

Appendix A, which is attached hereto and incorporated herein by reference, forms part of the subject disclosure and describes the mathematical quotations relevant to numerical analysis of the performance parameters and characteristics of a supersonic turbine accordance with the disclosure.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted.

Appendix A

NUMERICAL ANALYSIS: SUPERSONIC MAGJET (S-MAGJET)

Since S-MAGJET, the preferred embodiment is a low bypass turbofan without afterburning augmented by high speed electric bypass fan air and accelerated superconducting power turbine conbustion with rich to lean fuel burn flow increasing $S$, $\pi_S$ and $\tau_S$, and seperate exhaust streams in which afterburning may operate in the core and duct burning may operate in the fanstream, with the turbofan cycle having three design variables, and its' performance even with limited losses can be understood by performing parametric analysis, plotting the results versus value of the design variables, and comparing results to the performance of the ideal S-MAGJET or supersonic engine.

TECHNICAL ASSUMPTIONS:

- Compressor pressure ratio: $\pi_c$
- Fan pressure ratio: $\pi_f$
- Bypass ratio: $\alpha = \dfrac{M_F}{M_C} = \dfrac{\text{GAS FLOW THROUGH FAN}}{\text{GAS FLOW THROUGH CORE}}$
- Thrust specific fuel consumption: $S$
- Stage pressure ratio: $\pi_S$
- Stage efficiency: $\eta$
- Total temperature ratio of a stage: $\tau_S$
- Specific thrust: $F/m_0$
- Fuel/Air Ratio: $f$
- Propulsive efficiency: $\eta_p$
- Thermal efficiency: $\eta_r$
- Overall efficiency: $\eta_0$
- Ratio of total pressures: $\pi$
  Component subscript:
  Diffuser (inlet) = $d$
  Compressor = $c$
  Burner = $b$
  Turbine = $t$
  Nozzle = $n$
  Fan = $f$
- Ratio of burner exit enthalpy $C_p\tau_t$ to $C_pT_0$, ambient enthalpy $$\tau_\lambda \; \dfrac{(C_pJt)\text{ burner exit}}{(C_pT)_0}$$

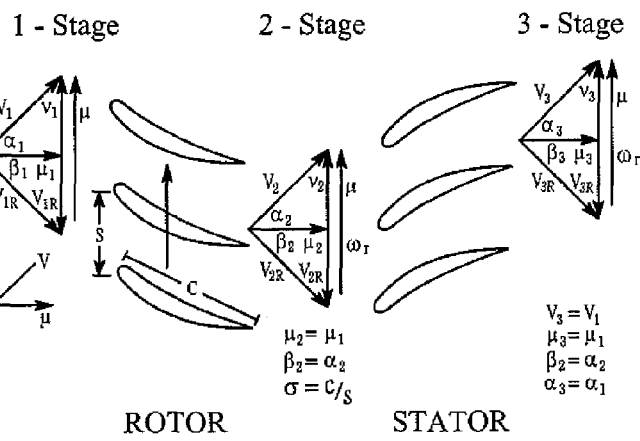

- Mass flow ratio $\alpha'$ given the area ratio $A_{16}/A_6$ or visa versa (Refer to S-MAGJET station numbering illustration)
- Total enthalpy ratio of the turbine, $\tau_t$
- Total presure ratio, $\pi_t$
- Polytropic efficiency of a turbine, $e_t = \dfrac{dh_t}{dh_{ti}}$
- Insentropic efficiency of a turbine, $\eta_t = \dfrac{h_{t4}-h_{t5}}{h_{t4}-h_{t5i}}$

STEPS TO S-MAGJET PARAMETRIC CYCLE ANALYSIS

DERIVATION OF EQUATIONS:

1) Mach number $M_0$ for uninstalled engine thrust $$F = \frac{1}{g_c}(M_g V_e - M_0 V_0) + A_g(P_9 - P_0)$$

2) Velocity ratios $V_9/a_0$ in terms of mach number $$\left(\frac{V_9}{a_0}\right)^2 = \frac{a_9^2 M_9^2}{a_0^2} = \frac{y_9 R_9 g_c T_9}{y_0 R_0 g_c T_0} M_9^2$$

3) Exit mach number $M_9$

Thus: $P_{t9} = P_9 \left(1 + \frac{y-1}{2} M_9^2\right)^{y/y-1}$

Then: $M_9^2 = \frac{2}{y-2}\left[\left(\frac{P_{t9}}{P_9}\right)^{(y-1/y)}\right]$ Where: $\frac{P_{t9}}{P_9} = \frac{P_0}{P_9}\frac{P_{t0}}{P_0}\frac{P_{t2}}{P_{t0}}\frac{P_{t3}}{P_{t2}}\frac{P_{t4}}{P_{t3}}\frac{P_{t5}}{P_{t4}}\frac{P_{t7}}{P_{t5}}\frac{P_{t9}}{P_{t7}} = P_0 \pi_r \pi_d \pi_b \pi_n$ However, $\pi_d = \pi_b = \pi_n = 1$ For an ideal engine Thus: $P_{t9} = P_0 \pi_r$ AND $\frac{P_{t9}}{P_9} = \frac{P_{t9}}{P_0}\frac{P_{t9}}{P_9} = \pi_r \frac{P_0}{P_9} = \pi_r$ $$M_9^2 = \frac{2}{y-1}\left[\left(\frac{P_{t9}}{P_9}\right)^{(y-1/y)} - 1\right]$$

$$M_9^2 = \frac{2}{y-1}\left(\pi_r^{(y-1)/y} - 1\right)$$

Where: $\frac{P_{t9}}{P_9} = \frac{P_{t9}}{P_9}\frac{P_0}{P_9} = \pi_r \pi_c \pi_t \frac{P_0}{P_9} = \pi_r \pi_c \pi_t$ Then: $M_9^2 = \frac{2}{y-1}\left[\left(\pi_r \pi_c \pi_t\right)^{(y-1/y)} - 1\right]$ However, $\pi_r^{(y-1)/y} = \tau_r$ and for an ideal S-MAGJET:

$$\pi_r^{(y-1)/y} = \tau_c \text{ AND } \pi_t^{(y-1)/y} = \tau_t$$

Thus: $M_9^2 = \frac{2}{y-1}\left(\tau_r \tau_c \tau_t\right) - 1$

4) The temperature ratio $T_9/T_0$ $$\frac{T_9}{T_0} = \frac{T_{t9}/T_0}{T_{t9}/T_9} = \frac{T_{t9}/T_0}{(P_{t9}/P_9)^{(y-1)/y}}$$

Where: $\frac{T_{t9}}{T_0} = \frac{T_{t0}}{T_0}\frac{T_{t2}}{T_{t0}}\frac{T_{t3}}{T_{t2}}\frac{T_{t4}}{T_{t3}}\frac{T_{t5}}{T_{t4}}\frac{T_{t7}}{T_{t5}}\frac{T_{t9}}{T_{t7}} = \tau_r \tau_d \tau_c \tau_b \tau_t \tau_{AB} \tau_n = T_0 \tau_r \tau_c \tau_b \tau_t$ Then: $\frac{T_9}{T_0} = \frac{T_{t9}/T_0}{T_{t9}/T_9} = \frac{\tau_r \tau_c \tau_b \tau_t}{(P_{t9}/P_9)^{(y-1)/y}} = \frac{\tau_r \tau_c \tau_b \tau_t}{(\pi_r \pi_c \pi_t)^{(y-1/y)}} =$ $$= \frac{\tau_r \tau_c \tau_b \tau_t}{\tau_r \tau_c \tau_t} = \frac{T_9}{T_0} = \tau_b$$

5) Application of the steady flow energy equation to the burner gives $$M_0 h_{t3} + M_f h_{pr} = (M_0 + M_f) h_{t3}$$

The ideal cycle is represented by $$M_0 + M_f \cong M_0 \quad \text{AND} \quad C_{p3} = C_{p4} = C_p$$

Thus: $M_0 C_p T_{t3} + M_f h_{pr} = M_0 C_p T_{t4}$ $$M_f h_{pr} = M_0 C_p (T_{t4} - T_{t3}) = M_0 C_p T_0 \left(\frac{T_{t4}}{T_0} - \frac{T_{t3}}{T_0}\right)$$

or $f = \frac{M_f}{M_0} = \frac{C_p T_0}{h_{pr}} \left(\frac{T_{t4}}{T_0} - \frac{T_{t3}}{T_0}\right)$ However, $\tau_\lambda = \frac{T_{t4}}{T_0}$ AND $\tau_r \tau_c = \frac{T_{t3}}{T_0}$ Then: $f = \frac{M_f}{M_0} = \frac{C_p T_0}{h_{pr}} (\tau_\lambda - \tau_r \tau_c)$ or $f = \frac{M_f}{M_0} = \frac{C_p T_0}{h_{pr}} (\tau_b - 1)$, and using the temperature ratio's give $$\tau_r \tau_c + f \frac{\eta_b h_{pr}}{C_p T_0} = (1 + f) \tau_\lambda \quad \text{Solving for fuel/air ratio gives}$$

$$f = \frac{\tau_\lambda - \tau_r \tau_c}{\eta_b h_{pr}/(C_p T_0) - \tau_\lambda}$$

6) Power out of the turbine is:

$$W_t = (M_0 + M_f)(h_{t4} - h_{t5}) \cong M_0 C_p (T_{t4} - T_{t5})$$

or $\tau_t = 1 - \frac{T_{t2}}{T_{t4}}(\tau_c - 1)$  Thus: $\tau_t = 1 - \frac{\tau_r}{\tau_\lambda}(\tau_c - 1)$ The power balance between the turbine and compressor, with a mechanical efficiency $\eta_m$ of the turbine compressor coupling gives:

power into compressor = net power from turbine $$M_0 C_{p6}(T_{t3} - T_{t2}) = \eta_m M_4 C_{pt}(T_{t4} - T_{t5})$$

Dividing the above equation by $M_0 C_{pc} T_{t2}$ gives:

$$\tau_t = 1 - \eta_m(1+f)\frac{\tau_\lambda}{\tau_r}(1+\tau_t)$$

Solving for the turbine temperature ratio gives:

$$\tau_t = 1 - \frac{1}{\eta_m(1+f)}\frac{\tau_r}{\tau_\lambda}(\tau_c - 1)$$

This expression allows for solving for $\tau_t$, from which we then obtain $$\pi_t = \tau_t^{y_t/[(y_t - 1)e_t]}$$

Note that $\tau_t$ will be given in terms of $e_t$ by:

$$\eta_t = \frac{1 - \tau_t}{1 - \tau_t^{1/e_t}}$$

This also requires the calculation of $\tau_c$ to allow determination of $\tau_t$. Thus we note:

$$\tau_c = \pi_t^{(y_c - 1)/(y_c e_c)}$$

Then also for $\eta_c$ we have:

$$\eta_c = \frac{\pi_c^{(y_c - 1)y_c}}{\tau_c - 1}$$

7) Combining the equations for bypass fan stream and engine core in low bypass turbofan with afterburning and separate exhaust, which is S-MAGJET gives:

$$\frac{F}{M_0} = \frac{1}{1+\alpha} \frac{a_0}{g_c} \left[ (1+f)\frac{V_9}{a_0} - M_0 + (1+f)\frac{R_t T_{t9}/T_0}{R_c V_9/a_0} \frac{1-P_0/P_9}{y_c} \right] +$$

$$\frac{\alpha}{1+\alpha} \frac{a_0}{g_c} \left( \frac{V_{19}}{a_0} - M_0 + \frac{T_{19}/T_0}{V_{19}/a_0} \frac{1-P_0/P_9}{y_c} \right) : \text{Cannot be simplified beyond this point}$$

Substituting $f_{AB}$ for afterburning, $\frac{R_{AB}}{R_c}$ for $\frac{P_0/P_{19}}{y_c}$ We obtain:

Special thrust =

$$\frac{F}{M_0} = \frac{1}{1+\alpha} \frac{a_0}{g_c} \left[ (1+f+f_{AB})\frac{V_9}{a_0} - M_0 + (1+f+f_{AB})\frac{R_{AB}}{R_c} \times \frac{T_9/T_0}{V_9/a_0} \frac{1-P_0/P_9}{y_c} \right]$$

$$+ \frac{\alpha}{1+\alpha} \frac{a_0}{g_c} \left[ (1+f_{DB})\frac{V_{19}}{a_0} - M_0 + (1+f_{DB})\frac{R_{DB}}{R_c} \times \frac{T_{19}/T_0}{V_{19}/a_0} \frac{1-P_0/P_{19}}{y_c} \right]$$

8) The thrust specific fuel consumption $S$ for S-MAGJET is dervived by:

$$S = \frac{\dot{M}_f}{F} = \frac{M_f + M_{AB} + M_{fDB}}{F} = \frac{f + f_{AB} + \alpha_{fDB}}{(1+\alpha)(F/\dot{M}_0)}$$

9) Definition of propulsion, $\eta_p$ and thermal, $\eta_T$ effeciency Is:

$$\eta_p = \frac{2 g_c V_0 (F/\dot{M}_0)}{a_0^2 \left[ (1 + f + f_{AB})(V_9/a_0)^2 - M_0^2 \right]}$$

$$\eta_T = \frac{a_0^2 \left[ (1 + f + f_{AB})(V_9/a_0)^2 - M_0^2 \right]}{2 g_c (f + f_{AB}) h_{pr}}$$

From here we consider a subsonic constant-area mixer with primary and secondary streams of calorically perfect gases having different $C_p$ and y values. We assume the flow to be one-dimensional, and the subscripts 6, 16 and 6A are used for the core, bypass and mixed streams respectively in S-MAGJET we are assuming values of $C_p$ and y of the core and bypass streams are known, as well as $M_6$ and the following-baseline values and ratios.

$$C_{pc} = 1.006 \text{ KJ/(kg·K)}$$
$$y = 1.47$$

$$\frac{T_{t16}}{T_{t6}} \quad \frac{P_{t16}}{P_{t6}} \quad \text{AND} \quad \alpha' = \frac{\dot{M}_{16}}{\dot{M}_6} \quad \text{OR} \quad \frac{A_{16}}{A_6}$$

Mach number of the secondary stream is determined by and the total pressure ratio $P_{t6}/P_{t16}$, below:

$$\frac{P_{t16}}{P_{t6}} = \frac{\{1 + [(y_{16} - 1)/2] M_{16}^2\}^{y_{16}/(y_{16} - 1)}}{\{1 + [(y_6 - 1)/2] M_6^2\}^{y_6/(y_6 - 1)}}$$

Simplifying algebraically we have, $$M_{16} = \sqrt{\frac{2}{y_{16} - 1} \left\{ \left[ \frac{P_{t16}}{P_{t6}} \left( 1 + \frac{y_6 - 1}{2} M_6^2 \right)^{y_6/(y_6 - 1)} \right]^{y_{16}/(y_{16} - 1)} - 1 \right\}}$$

For the bypass fan stream we have:

$$\frac{V_{t6}}{a_0} = M_{16} \sqrt{\frac{y_{DB} R_{DB} T_{16}}{y_c R_c T_0}}$$

For the core stream of S-MAGJET we have:

$$\frac{V_{t6}}{a_0} = M_6 \sqrt{\frac{\gamma_{AB} R_{AB} T_6}{\gamma_c R_c T_0}}$$

Taking the ratios of the equation solving for $M_{16}$ written for the low bypass fan stream and the core stream in S-MAGJET gives the following relationship between the inlet flow properties $$\frac{\alpha' \sqrt{T_{t16}/T_{t6}}}{A_{16}/A_6} = \frac{M_{16}}{M_6} \sqrt{\frac{\gamma_{16} R_6}{\gamma_6 R_{16}} \frac{1 + [(\gamma_{16}-1)/2] M_{16}^2}{1 + [(\gamma_6-1)/2] M_6^2}}$$

The invention claimed is:

1. A shaftless gas turbine engine comprising:
   a. an outer casing of generally cylindrical shape and having a first end, a second end and a length, wherein the outer casing provides the load bearing surface of the engine;
   b. a nozzle section within the first end of the outer casing;
   c. a turbine section within the outer casing between the nozzle section and the second end, wherein the turbine section includes a plurality of electromagnetically segmented multi-stage power turbine levitation coils;
   d. a combustor section within the outer casing between the turbine section and the second end;
   e. a compressor section within the outer casing between the combustor section and the second end, wherein the compressor section includes a plurality of multi-stage segmented compressor levitation coils;
   f. a bypass fan section within the outer casing between the compressor section and the second end, wherein the bypass fan section includes a plurality of dual counter rotating bypass fan magnetic coils;
   g. an inlet section within the second end of the outer casing; and
   h. a hollow core within a center of the outer casing establishing a shaftless section of the outer casing and extending the length of the outer casing passing through the nozzle section, the turbine section, the combustor section, the compressor section and the bypass fan section, wherein the hollow core is configured to allow ambient air to pass through, without being subject to action by any of the nozzle section, the turbine section, the combustor section, the compressor section and the bypass fan section, wherein the inlet section is configured to deliver a portion of incoming air from the second end into the hollow core and a portion into the bypass fan section and wherein the turbine section, the compressor section and the bypass fan section are maintained in position within the outer casing by magnetic levitation air bearings located at the electromagnetically segmented multi-stage power turbine levitation coils, the multi-stage segmented compressor levitation coils and the dual counter rotating bypass fan magnetic coils, respectively.

2. The gas turbine engine of claim 1 wherein the bypass fan section includes two alternating rows of bypass fan blades and diffuser blades, wherein there are bypass fan blades closest to the compressor section and closest to the inlet section.

3. The gas turbine engine of claim 1 wherein the compressor section includes a plurality of turbine blade pairs, wherein the turbine blade pairs are magnetically levitated by pairs of permanent magnets.

4. The gas turbine engine of claim 1 wherein the nozzle section includes a magnetohydrodynamic accelerator configured to ionize gas from the combustor section.

5. The gas turbine engine of claim 1 wherein the magnetohydrodynamic accelerator includes a series of ring accelerator induction electrode plates.

* * * * *